US012665423B2

(12) United States Patent
Hedman et al.

(10) Patent No.: US 12,665,423 B2
(45) Date of Patent: Jun. 23, 2026

(54) SYSTEMS AND METHODS FOR AC OPTIMAL POWER FLOW MODELING FOR UNBALANCED DISTRIBUTION SYSTEMS

(71) Applicants: Mojdeh Hedman, Tempe, AZ (US); Zahra Soltani, Tempe, AZ (US)

(72) Inventors: Mojdeh Hedman, Tempe, AZ (US); Zahra Soltani, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 380 days.

(21) Appl. No.: 18/432,332

(22) Filed: Feb. 5, 2024

(65) Prior Publication Data

US 2024/0291274 A1     Aug. 29, 2024

Related U.S. Application Data

(60) Provisional application No. 63/443,259, filed on Feb. 3, 2023.

(51) Int. Cl.
*H02J 3/40*        (2026.01)
*H02J 3/001*       (2026.01)
(Continued)

(52) U.S. Cl.
CPC ............... *H02J 3/16* (2013.01); *H02J 3/001* (2020.01); *H02J 3/38* (2013.01); *H02J 3/381* (2013.01); *H02J 3/40* (2013.01); *H02J 3/48* (2013.01); *H02J 3/50* (2013.01); *H02J 2101/24* (2026.01); *H02J 2103/30* (2026.01)

(58) Field of Classification Search
CPC ...... H02J 3/001; H02J 3/16; H02J 3/18; H02J 3/26; H02J 3/38; H02J 3/381; H02J 3/40; H02J 3/46; H02J 3/466; H02J 3/48; H02J 3/50; H02J 2101/24; H02J 2103/30; H02J 2103/35
See application file for complete search history.

(56) References Cited

U.S. PATENT DOCUMENTS 8,756,556 B1 *   6/2014   Raghunathan ............ H02J 3/06
                                                716/120
9,184,589 B2 *   11/2015   Raghunathan .......... G06F 17/11
(Continued)

OTHER PUBLICATIONS

Arnold, D.B., et al., "Optimal Dispatch of Reactive Power for Voltage Regulation and Balancing in Unbalanced Distribution Systems," in 2016 IEEE Power and Energy Society General Meeting (PESGM), Jul. 2016, pp. 1-5.
(Continued)

*Primary Examiner* — Levi Gannon
(74) *Attorney, Agent, or Firm* — Polsinelli PC

(57)        ABSTRACT

A system and associated method models behavior of an unbalanced distribution system using a current-voltage (IVACOPF) formulation. Untransposed distribution lines, shunt elements of distribution lines, and detailed representation of distribution transformers and DERs are modeled. The system provides detailed modeling of distribution system including mutual impedances, shunt elements, 3-phase to 1-phase lines. The model has multiple applications for distribution system management, planning, and operation.

20 Claims, 14 Drawing Sheets
(9 of 14 Drawing Sheet(s) Filed in Color)

(51) Int. Cl.

| | | |
|---|---|---|
| *H02J 3/16* | (2006.01) | |
| *H02J 3/38* | (2006.01) | |
| *H02J 3/48* | (2026.01) | |
| *H02J 3/50* | (2026.01) | |
| *H02J 101/24* | (2026.01) | |
| *H02J 103/30* | (2026.01) | |

(56) References Cited

U.S. PATENT DOCUMENTS

| | | | | |
|---|---|---|---|---|
| 10,139,800 | B2* | 11/2018 | Dhople | H02J 3/00 |
| 2004/0071000 | A1* | 4/2004 | Escobar | H02J 3/01 |
| | | | | 363/63 |
| 2012/0022713 | A1* | 1/2012 | Deaver, Sr. | G05B 17/02 |
| | | | | 700/298 |
| 2015/0094965 | A1* | 4/2015 | Schneider | H02J 13/333 |
| | | | | 702/58 |
| 2017/0005515 | A1* | 1/2017 | Sanders | H02J 3/14 |
| 2017/0214244 | A1* | 7/2017 | Dall'Anese | H02J 3/06 |
| 2019/0312439 | A1* | 10/2019 | Cottrell | B64D 47/00 |
| 2025/0023360 | A1* | 1/2025 | Sun | H02J 3/003 |

OTHER PUBLICATIONS

Farivar, M., et al., "Optimal Inverter VAR Control in Distribution Systems with High PV Penetration," in 2012 IEEE Power and Energy Society General Meeting, Jul. 2012, pp. 1-7.

Nguyen, Q., et al., Exact Optimal Power Dispatch in Unbalanced Distribution Systems with High PV Penetration, IEEE Transactions on Power Systems, vol. 34, No. 1, pp. 718-728, Jan. 2019.

Rezvani, M.M., et al., "Interaction of Transmission-Distribution System in the Presence of DER Units-Co-simulation Approach," IEEE Open Journal of Industry Applications, vol. 1, pp. 23-32, 2020.

Savasci, A., et al., "Distribution Grid Optimal Power Flow Integrating Volt-Var Droop of Smart Inverters," in 2021 IEEE Green Technologies Conference, Apr. 2021, pp. 54-61.

Soltani, Z., et al., "Simultaneous Robust State Estimation, Topology Error Processing, and Outage Detection for Unbalanced Distribution Systems," 2022. [Online]. Available: http://arxiv.org/abs/2105.10111.

Sun, X., et al., "Optimal Local Volt/Var Control for Photovoltaic Inverters in Active Distribution Networks," IEEE Transactions on Power Systems, vol. 36, No. 6, pp. 5756-5766, Nov. 2021.

Zhang, Q., et al., "Distributed CVR in Unbalanced Distribution Systems With PV Penetration," IEEE Transactions on Smart Grid, vol. 10, No. 5, pp. 5308-5319, Sep. 2019.

"IEEE Standard for Interconnection and Interoperability of Distributed Energy Resources with Associated Electric Power Systems Interfaces," IEEE Std 1547-2018 (Revision of IEEE Std 1547-2003), pp. 1-138, Apr. 2018.

Chen, "Optimal Placement of PV Smart Inverters with Volt-Var Control In Electric Distribution Systems" (Paper), Jul. 1, 2022 pp. 1-8 https://skysong.inteum.com/skysong/Minuet/Home/Download-Document/DOCUMENT47246119B6.

Soltani, "Optimal Scheduling of Distributed Energy Resources Considering Volt-Var Controller of PV Smart Inverters" (Paper), Jul. 25-30, 2022, pp. 1-6 https://skysong.inteum.com/skysong/Minuet/Home/DownloadDocument/DOCUMENT47246122 B11.

Montano-Martinez, "Detailed Primary and Secondary Distribution System Model Enhancement Using AMI Data" (Paper) Jan. 10, 2022, pp. 1-14 https://skysong.inteum.com/skysong/Minuet/Home/DownloadDocument/DOCUMENT47246128B21.

* cited by examiner

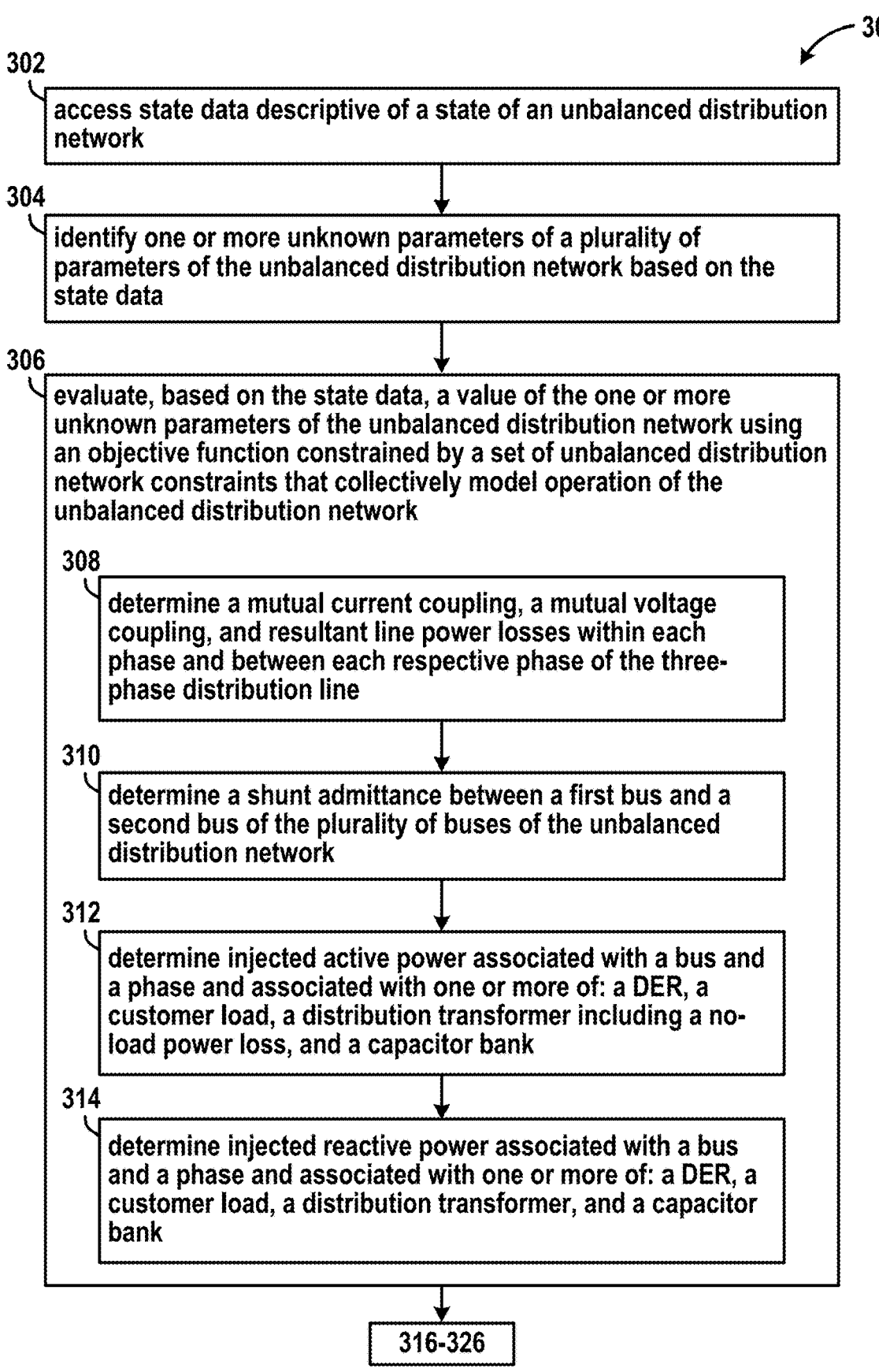

302 access state data descriptive of a state of an unbalanced distribution network

304 identify one or more unknown parameters of a plurality of parameters of the unbalanced distribution network based on the state data

306 evaluate, based on the state data, a value of the one or more unknown parameters of the unbalanced distribution network using an objective function constrained by a set of unbalanced distribution network constraints that collectively model operation of the unbalanced distribution network

308 determine a mutual current coupling, a mutual voltage coupling, and resultant line power losses within each phase and between each respective phase of the three-phase distribution line

310 determine a shunt admittance between a first bus and a second bus of the plurality of buses of the unbalanced distribution network

312 determine injected active power associated with a bus and a phase and associated with one or more of: a DER, a customer load, a distribution transformer including a no-load power loss, and a capacitor bank

314 determine injected reactive power associated with a bus and a phase and associated with one or more of: a DER, a customer load, a distribution transformer, and a capacitor bank 316-326

FIG. 3A

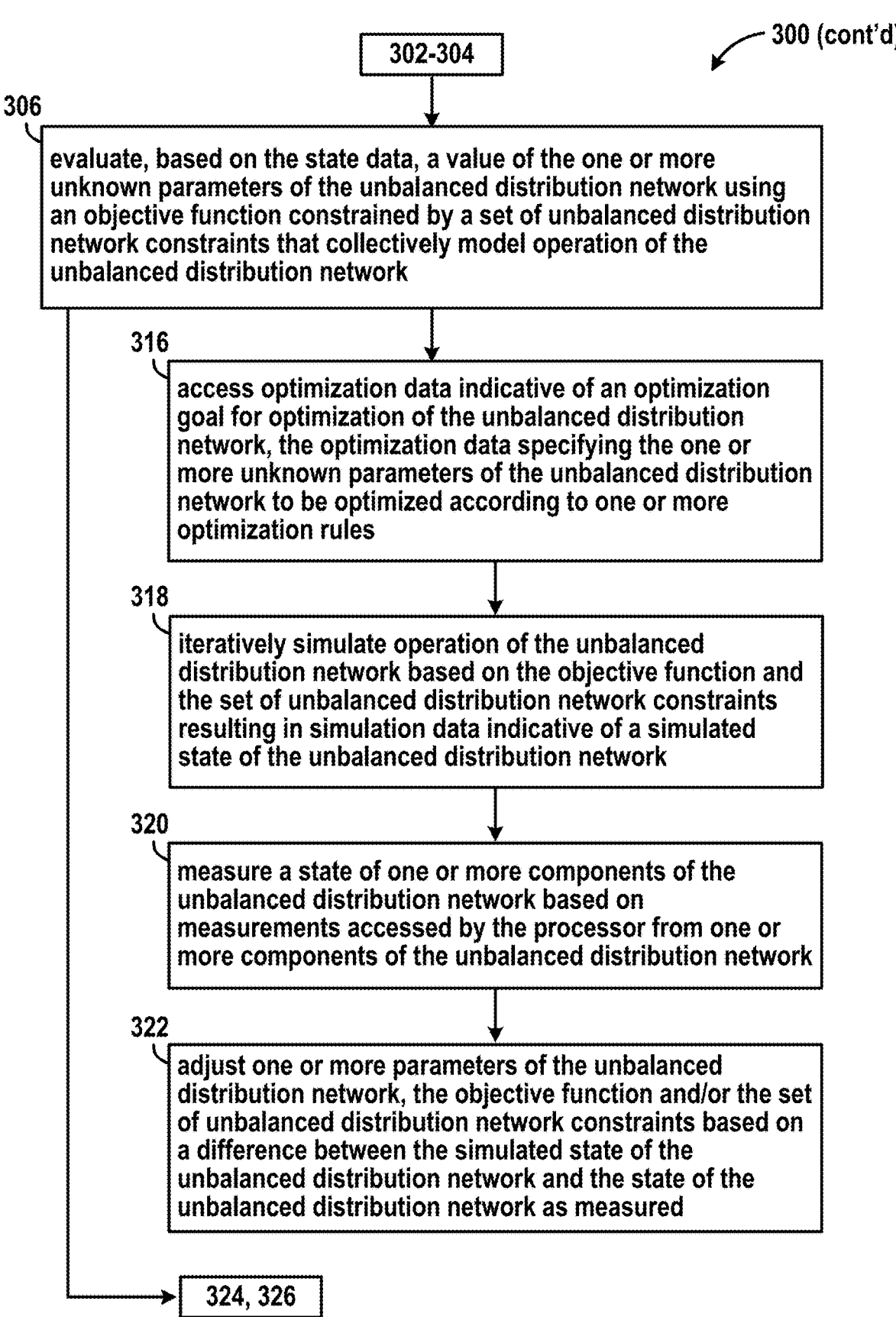

302-304

300 (cont'd)

306 evaluate, based on the state data, a value of the one or more unknown parameters of the unbalanced distribution network using an objective function constrained by a set of unbalanced distribution network constraints that collectively model operation of the unbalanced distribution network

316 access optimization data indicative of an optimization goal for optimization of the unbalanced distribution network, the optimization data specifying the one or more unknown parameters of the unbalanced distribution network to be optimized according to one or more optimization rules

318 iteratively simulate operation of the unbalanced distribution network based on the objective function and the set of unbalanced distribution network constraints resulting in simulation data indicative of a simulated state of the unbalanced distribution network

320 measure a state of one or more components of the unbalanced distribution network based on measurements accessed by the processor from one or more components of the unbalanced distribution network

322 adjust one or more parameters of the unbalanced distribution network, the objective function and/or the set of unbalanced distribution network constraints based on a difference between the simulated state of the unbalanced distribution network and the state of the unbalanced distribution network as measured 324, 326

FIG. 3B

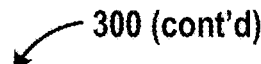

300 (cont'd)

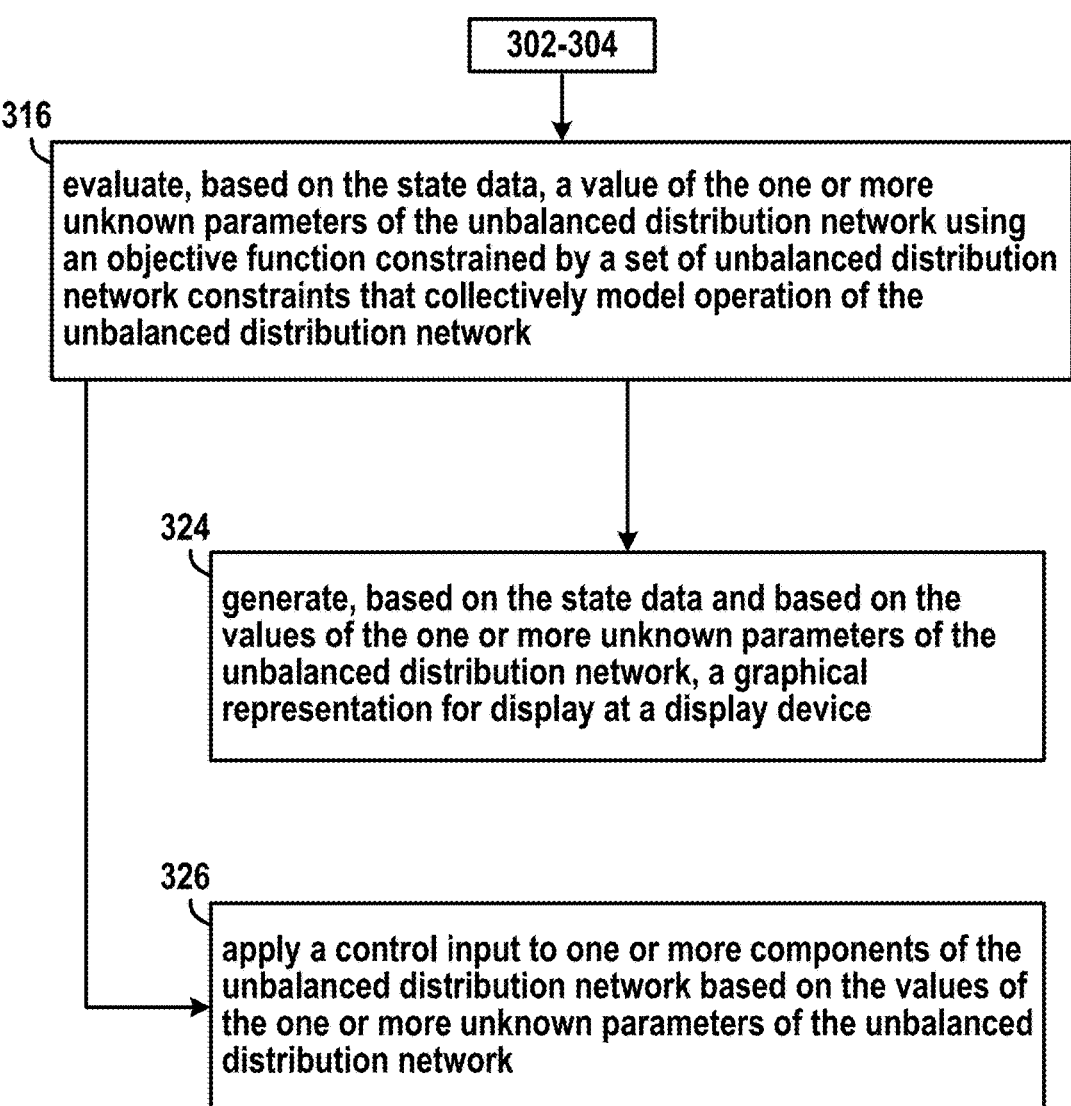

302-304

316 evaluate, based on the state data, a value of the one or more unknown parameters of the unbalanced distribution network using an objective function constrained by a set of unbalanced distribution network constraints that collectively model operation of the unbalanced distribution network

324 generate, based on the state data and based on the values of the one or more unknown parameters of the unbalanced distribution network, a graphical representation for display at a display device

326 apply a control input to one or more components of the unbalanced distribution network based on the values of the one or more unknown parameters of the unbalanced distribution network

FIG. 3C

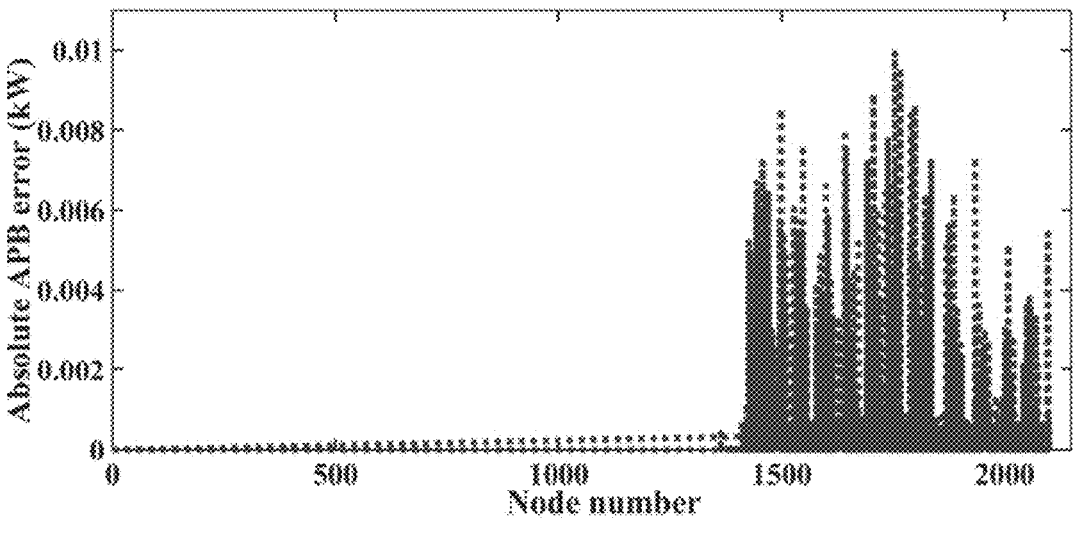
FIG. 8
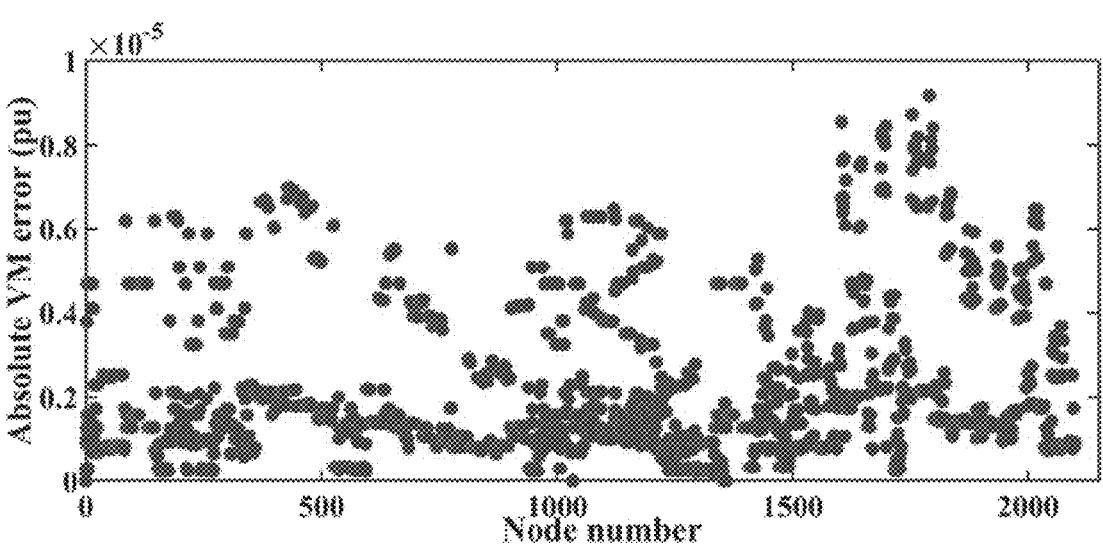
FIG. 9
FIG. 10

SYSTEMS AND METHODS FOR AC OPTIMAL POWER FLOW MODELING FOR UNBALANCED DISTRIBUTION SYSTEMS

CROSS REFERENCE TO RELATED APPLICATIONS

This is a non-provisional application that claims benefit to U.S. Provisional Application Ser. No. 63/443,259, filed on Feb. 3, 2023, which is herein incorporated by reference in its entirety.

GOVERNMENT SUPPORT

This invention was made with government support under DE-AR0001001 awarded by the Department of Energy. The government has certain rights in the invention.

FIELD

The present disclosure generally relates to power distribution systems, and in particular, to a system and associated methods for modeling behavior of an unbalanced distribution system.

BACKGROUND

With proliferation of distributed energy resources (DERs), distribution management systems (DMSs) need to be advanced in order to enhance the reliability and efficiency of modern distribution systems. Distribution systems modeling is complex due to their unique nature. Traditionally, transmission (high voltage) scheduling models were the focus of power system analysis. However, with integration of distributed energy resources such as renewable energy resources, distribution system modeling (medium and low voltage) is even more important. Prior work make many assumptions for distribution system AC optimal power flow. Some of these assumptions are erroneous and fail to take into account mutual impedances, shunt elements, and active/reactive power injection from DERs such as consumer-level renewable energy resources (e.g., rooftop solar arrays, etc.) that "give back" to the grid. This issue also reflects that most city infrastructures were not designed with renewable energy resources in mind; as such, new modeling technologies are desired in order to equip existing systems to handle renewable energy resources.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A-3C are a series of process flow diagrams showing a computer-implemented method for unbalanced AC optimal power flow modeling of an unbalanced distribution system;

FIG. 8 is a graphical representation showing absolute linearization error of active power balance (APB) constraint for each bus and phase of a utility feeder;

FIG. 9 is a graphical representation showing absolute linearization error of reactive power balance (RPB) constraint for each bus and phase of a utility feeder;

FIG. 10 is a graphical representation showing absolute linearization error of voltage magnitude (VM) constraint for each bus and phase of a utility feeder;

Corresponding reference characters indicate corresponding elements among the view of the drawings. The headings used in the figures do not limit the scope of the claims.

DETAILED DESCRIPTION

I. Introduction

Figure 1A:
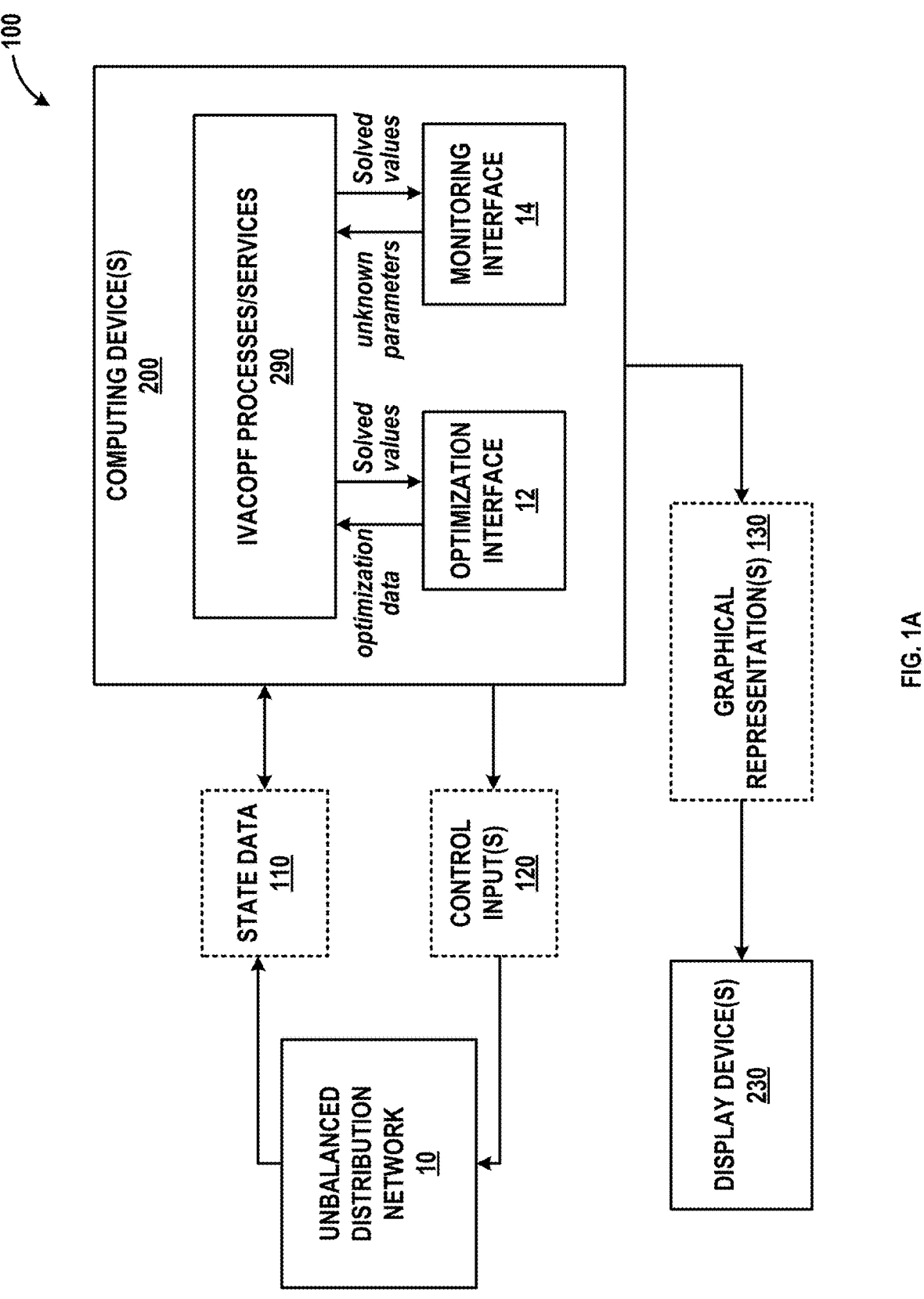
FIG. 1A is a simplified block diagram showing an example environment for unbalanced AC optimal power flow modeling of an unbalanced distribution system.

Real-time operation and control of distribution systems has not been significantly automated due to limitation of communication infrastructure, real-time monitoring, and operational scheduling tools. Also, the energy democracy movement is resulting in more and more penetration of energy resources in electric distribution systems. Distributed energy resources (DERs) introduce simultaneous security and reliability challenges and benefits in distribution networks. Ever-increasing penetration levels of intermittent DERs in distribution systems and active involvement of end users cause new challenges in power systems and make management of a distribution system with DERs a sophisticated task. For instance, reverse power flow in distribution systems is introduced due to the high penetration of DERs. Moreover, electric utilities observe larger voltage fluctuations and, in some cases, even voltage violations, i.e., overvoltage and undervoltage issues. Furthermore, distribution assets are being utilized closer to their rated capacity.

For example, the high level of electric vehicle adoptions in certain locations has raised concerns about overload of distribution transformers. Successful transition from the conventional passive to the modern active distribution systems with vast number of small resources requires accurate planning and efficient management of these resources. Therefore, accurate distribution system modeling in unbalanced AC optimal power flow (ACOPF), as a critical algorithm for advanced distribution management systems (ADMS) and DER management systems (DERMS), is essential for effective management of modern distribution networks.

ACOPF problem is nonconvex and NP-hard due to nonlinear power flow equations. Existing approaches for solving the optimal power flow (OF) problem are classified into using nonlinear algorithms (which search for a local optimal solution of the OPF problem), approximation, and convexification of power flow equations. Nonlinear algorithms include trust-region based methods, Lagrangian Newton method, and interior-point methods. However, they may converge to a local minimum without assurance on the quality of the solution. DCOPF is a popular linear approximation of power flow equations. However, assumptions of DC power flow model are not suitable for the distribution networks with high R/X ratios and losses. Convex relaxation provides the ability to check the feasibility and global optimality of ACOPF problem and could find the global optimal solution. For convex relaxations, second-order cone programming (SOCP) is one proposed solution to solve the OPF problem for distribution system based on bus injection and branch flow model. Semidefinite programming (SDP) based on bus injection model is another method for convexifying the feasibility set of ACOPF problem. Chordal relaxation is one strategy employed in current technologies, which exploits graph sparsity to simplify the SDP relaxation of OPF problem. However, these strategies consider a balanced distribution network, which make them inadequate for modern distribution system analysis and operational scheduling. Distribution systems are multiphase and unbalanced due to the existence of unbalanced loads and DERs as well as un-transposed line segments. Also, due to mutual impedance of the line segments, there is a coupling between the phases; neglecting such couplings can result in inaccuracy and may not reflect physical operation conditions.

In one work, SDP relaxation and linear approximation of OPF problem are proposed for radial unbalanced distribution networks. Recent work shows that SDP may encounter numerical stability problems. A Distribution ACOPF model, called LinDistFlow, is proposed by one research group for an unbalanced distribution network. However, these works ignore line losses and consider bus voltages to be nearly balanced, which are not valid assumptions in unbalanced multi-phase distribution networks.

The existing gaps of prior unbalanced distribution ACOPF approaches are summarized as follows:

Nonlinear approaches: These approaches suffer from computational complexity and scalability challenges for large real distribution systems. Also, these approaches may result in sub-optimal solutions or may not converge.

Convex relaxations: The scalability and exactness of the solution are not guaranteed and are dependent on system conditions and choices of objective function.

Existing linearized unbalanced distribution ACOPF: LinDisFlow model is vastly explored and adopted in various research; however, this approach contains inaccurate assumptions such as balanced phase voltage across the network and ignoring line losses. Moreover, the scalability and accuracy of other linear distribution ACOPF models are not sufficiently confirmed yet.

Thus, there still exists a need for a scalable unbalanced ACOPF approach, which accurately captures all details of distribution systems.

TABLE 1

| Nomenclature | |
|---|---|
| Table 1.1: Sets and Indices | |
| n, m | Index for bus, n, m $\in$ Y |
| $\phi$ | Index for phase, $\phi \in \psi = \{a, b, c\}$ |
| e | Index for measurement, e $\in \Gamma = \{1,2, \ldots, E\}$ |
| Table 1.2: Parameters and Constants | |
| $R_{n,m}^{\phi,p}$ | Resistance of line connecting bus n to bus m ($\phi$ = p: self resistance; $\phi \neq$ p: mutual resistance) |
| $X_{n,m}^{\phi,p}$ | Reactance of line connecting bus n to bus m ($\phi$ = p: self reactance; $\phi \neq$ p: mutual reactance) |
| $Z_{n,m}^{\phi,p}$ | Impedance of line connecting bus n to bus m ($\phi$ = p: self impedance; $\phi \neq$ p: mutual impedance) |
| $y_{n,m}^{\phi,p}$ | Shunt admittance of line connecting bus n to bus m ($\phi$ = p: self shunt admittance; $\phi \neq$ p: mutual shunt admittance) |
| $NL_{r,\phi}^{TR}$ | No load loss of transformer r at phase $\phi$ |
| $P_{j,\phi}^{DER,max}$ | Maximum active power of DER j at phase $\phi$ |
| $S_{j,\phi}^{DER,max}$ | Maximum apparent power of DER j at phase $\phi$ |
| $c_j^{DER}$ | Cost of procuring active power from DER j |
| $c_n^s$ | Cost of procuring active power from the bulk power system at bus n |
| $I_{n,m}^{max,\phi}$ | Maximum allowable current of phase $\phi$ of line between bus n to bus m |
| Table 1.3: Variable Parameters | |
| $I_{n,m}^{\phi}$ | Current of phase $\phi$ of line between bus n to bus m |
| $I_{n,m}^{r,\phi}$ | Real part of $I_{n,m}^{\phi}$ |
| $I_{n,m}^{im,\phi}$ | Imaginary part of $I_{n,m}^{\phi}$ |
| $V_n^{\phi}$ | Voltage at bus n and phase $\phi$ |
| $V_n^{r,\phi}$ | Real part of $V_n^{\phi}$ |
| $V_n^{im,\phi}$ | Imaginary part of $V_n^{\phi}$ |
| $I_n^{r,\phi}$ | Real part of current injection at bus n and phase $\phi$ |
| $I_n^{im,\phi}$ | Imaginary part of current injection at bus n and phase $\phi$ |
| $P_{j,\phi}^{DER}$ | Active power of DER j at phase $\phi$ |
| $Q_{j,\phi}^{DER}$ | Reactive power of DER j at phase $\phi$ |
| $d_{p,t,\phi}$ | Active power of load t at phase $\phi$ |
| $d_{q,t,\phi}$ | Reactive power of load t at phase $\phi$ |

TABLE 1-continued

| Nomenclature | |
| --- | --- |
| $Q^C_{f,\phi}$ | Reactive power of capacitor unit f at phase $\phi$ |
| $P^S_{n,\phi}$ | Active power of substation at phase $\phi$ |
| $Q^S_{n,\phi}$ | Reactive power of substation at phase $\phi$ |

The main contributions of this disclosure are presented as follows:

A computer-implemented system and associated methods outlined herein include an ACOPF tool based on accurate current-voltage formulation ("IVACOPF") to solve nonlinear ACOPF in an unbalanced distribution network with DERs. In the present formulation, unbalanced voltage phasors, untransposed distribution lines, shunt elements of distribution lines, mutual coupling between phases, line losses, and distribution transformers are modeled. It is worth mentioning that distribution line current flows in the proposed model are inherently linear, which reduces the complexity of the distribution system modeling and enables capturing more details of distribution networks. In the systems outlined herein, the power injection equations at distribution nodes are inherently nonlinear. However, this nonlinearity is limited to end nodes as opposed to nonlinear power-voltage models, where the nonlinearity relates to all distribution lines and spreads across the network. Moreover, the present nonlinear IVACOPF is linearized and convexified using the Taylor series to obtain a computationally tractable solution. However, this disclosure presents the detailed formulation of IVACOPF along with system security constraints and detailed modeling of DERs with Volt-VAR controller without complication of binary variables, which can be utilized for any unbalanced distribution system studies such as DERs scheduling, Volt-VAr control, and distribution system hosting capacity assessment.

In order to illustrate the effectiveness of the present nonlinear and convex IVACOPF approaches, their performance is examined and compared with OpenDSS software and widely used LinDisFlow algorithm for modeling unbalanced distribution systems.

The IVACOPF can be utilized for numerous unbalanced distribution system analyses such as various ADMS modules, Volt-VAr control, and distribution system hosting capacity assessment. In this disclosure, two applications of the proposed convex IVACOPF model for DERs scheduling and state estimation are presented and tested on a real-world utility feeder in Arizona, which confirms the scalability and accuracy of the proposed model.

Two state estimation problems including QP model and linear programming (LP) model are presented for an unbalanced primary distribution network with distribution phasor measurement units (micro-PMUs) and smart meters based on the convex IVACOPF model. A performance comparison between the LP approach and the QP model is conducted.

FIG. 1A shows an example environment 100 that can implement IVACOPF (nonlinear OR linear/convex) for unbalanced AC optimal power flow modeling of an unbalanced distribution network 10. As outlined in further detail herein, IVACOPF may be implemented at a computing device 200 (see FIG. 2 and section III.D of the present disclosure) as IVACOPF processes/services 290. The computing device 200 can access state data 110 for the unbalanced distribution network 10 which may be provided as input to the IVACOPF processes/services 290, as well as other processes that may be used in conjunction with the IVACOPF processes/services 290.

For example, FIG. 1A shows an optimization interface 12 which a user may interact with to specify optimization data (goals, rules, etc.). The optimization interface 12 may communicate the optimization data to IVACOPF, which can model the unbalanced distribution network 10 (or other unbalanced distribution networks; unbalanced distribution network 10 is an example) based on the state data and provide solved values (e.g., of unknown parameters) and other requested data back to the optimization interface 12.

In another example, FIG. 1A shows a monitoring interface 14 which may specify unknown parameters or other requests that a user or another system may need to know about such as but not limited to hypothetical scenarios (e.g., power outages), voltage/current/power values associated with a component of the unbalanced distribution network 10, etc. The monitoring interface 14 may communicate the unknown parameters to IVACOPF, which can model the unbalanced distribution network 10 based on the state data and provide solved values (e.g., of unknown parameters) and other requested data such as estimated states, voltage profiles, etc. back to the monitoring interface 14.

The modeling analysis results provided by IVACOPF may also be used to apply control inputs 120 to one or more components of the unbalanced distribution network 10. In a further aspect, the modeling analysis results provided by IVACOPF may be used to generate one or more graphical representation(s) 130 for display at a display device 230 (see FIG. 2).

The nonlinear and convex IVACOPF models are presented in Section II. In particular, a nonlinear IVACOPF formulation is presented in Section II.A, a linear/convex IVACOPF formulation is presented in Section II.B. The formulations of the DERs scheduling, as well as the QP and LP state estimation models and droop setting control are presented in Section III, with a computer-implemented system and method for IVACOPF being presented in Section III.D. Simulation results are discussed in Section IV. Section V provides a summarization of concepts outlined in this disclosure.

II. IVACOPF Models in Unbalanced Distribution Systems

This section presents the formulation of the nonlinear and convex IVACOPF models in an unbalanced three-phase distribution system, respectively.

A. Nonlinear IVACOPF Model

The objective function of the nonlinear IVACOPF model is defined in (1).

$$\min/\max \ f(I, V, P, Q) \tag{1}$$

where min/max represents minimizing/maximizing and f(I, V, P, Q) is an objective function of choice for a specific distribution system analysis, e.g., minimizing operation cost for DER scheduling, minimizing least squared error for state estimation, maximizing profit of DERs aggregation. The nonlinear IVACOPF model is subject to the constraints (4)-(5), (7)-(13), which are explained below.

Line Current Flow Constraints:

$$V_n^\phi - V_m^\phi = Z_{n,m}^{\phi,\phi} I_{n,m}^\phi + \sum_{p\in\psi, p\neq\phi} Z_{n,m}^{\phi,p}(I_{n,m}^p) - \tag{2}$$
$$\frac{1}{2}\sum_{p\in\psi} Z_{n,m}^{\phi,p}\left(\sum_{k\in\psi} y_{n,m}^{p,k} V_n^k\right), \forall, \phi \in \psi$$

In a three-phase distribution line connecting bus n to bus m, the voltage difference between the two ends at phase $\phi$ of the distribution line is formulated using (2). As shown in (2), voltage difference between buses n and m at phase $\phi$ is calculated using three terms. First term is due to the current on the same phase of the line denoted as $$I_{n,m}^\phi.$$

Second term includes current on the other phases of the line (i.e., $$I_{n,m}^p)$$

due to mutual impedances (i.e., $$Z_{n,m}^{\phi,p})$$

between phase $\phi$ and phase p (i.e., other phases). Third term is due to the current flowing in the line self and mutual shunt admittances, which is calculated by multiplying $$y_{n,m}^{p,k}$$

and $$V_n^k.$$

Based on (2), current flowing in phase $\phi$ of a three-phase distribution line is formulated using (3). As it is shown in (3), the current in one phase of a three-phase distribution line (i.e., $$I_{n,m}^\phi)$$

is a function of voltage of the same phase (i.e., $\phi$) as well as current and voltage of other phases due to mutual impendences and admittances. Equation (3) can be simplified using its real and imaginary parts as defined in (4)-(5), respectively. Equations (4)-(5) present the formulation of modeling distribution lines in IVACOPF. These constraints accurately represent the self and mutual resistive, inductive, and capacitive characteristics of distribution lines in real and imaginary current-voltage formulations, which are inherently linear.

$$I_{n,m}^\phi = Z_{n,m}^{\phi,\phi-1}\left[V_n^\phi - V_m^\phi - \sum_{p\in\psi, p\neq\phi} Z_{n,m}^{\phi,p}(I_{n,m}^p) + \right. \tag{3}$$
$$\left. \frac{1}{2}\sum_{p\in\psi} Z_{n,m}^{\phi,p}\left(\sum_{k\in\psi} y_{n,m}^{p,k} V_m^k\right)\right], \forall, \phi \in \psi$$

$$I_{n,m}^{r,\phi} = R_{n,m}^{\phi,\phi-1}\left[V_n^{r,\phi} - V_m^{r,\phi} - \right. \tag{4}$$
$$\sum_{p\in\psi, p\neq\phi} R_{n,m}^{\phi,p} I_{n,m}^{r,p} - \frac{1}{2}\sum_{p\in\psi} R_{n,m}^{\phi,p}\left(\sum_{k\in\psi} y_{n,m}^{p,k} V_n^{im,k}\right) + $$
$$\left. \sum_{p\in\psi} X_{n,m}^{\phi,p}\left(I_{n,m}^{im,p} - \frac{1}{2}\sum_{k\in\psi} y_{n,m}^{p,k} V_n^{r,k}\right)\right], \forall \phi \in \psi$$

$$I_{n,m}^{im,\phi} = R_{n,m}^{\phi,\phi-1}\left[V_n^{im,\phi} - V_m^{im,\phi} - \right. \tag{5}$$
$$\sum_{p\in\psi, p\neq\phi} R_{n,m}^{\phi,p} I_{n,m}^{im,p} + \frac{1}{2}\sum_{p\in\psi} R_{n,m}^{\phi,p}\left(\sum_{k\in\psi} y_{n,m}^{p,k} V_n^{r,k}\right) - $$
$$\left. \sum_{p\in\psi} X_{n,m}^{\phi,p}\left(I_{n,m}^{r,p} + \frac{1}{2}\sum_{k\in\psi} y_{n,m}^{p,k} V_n^{im,k}\right)\right], \forall \phi \in \psi$$

The current flowing in one phase of a three-phase transmission line connecting buses n and m is only a function of voltage of the same phase as expressed in (6). The current flowing in other two phases of the three-phase transmission line is calculated using three-phase balanced system rules (i.e., current magnitudes of three conductors are equal with phase angle difference 120°).

$$I_{n,m} = Z_{n,m}^{-1}(V_n - V_m) + \frac{1}{2}y_{n,m}V_n \tag{6}$$

It can be seen that (6) cannot be utilized for modelling current flowing in a line in a three-phase unbalanced distribution system. As shown in the formulation of (3), there are mutual couplings between phases of a line due to mutual impendences and admittances in unbalanced distribution networks. Eliminating such couplings in the distribution system studies can result in inaccurate modeling of the system, which may not represent physical operation conditions of the system.

Bus Current Injection Constraints $$I_n^{r,\phi} = \sum_{m\in\delta(n)} I_{n,m}^{r,\phi}, \forall n \in \Upsilon, \phi \in \psi \tag{7}$$

$$I_n^{im,\phi} = \sum_{m\in\delta(n)} I_{n,m}^{im,\phi}, \forall n \in \Upsilon, \phi \in \psi \tag{8}$$

Real and imaginary parts of current injected at each bus and each phase of a three-phase unbalanced distribution system are expressed as (7) and (8), respectively.

Power Balance Constraints $$\sum_{\forall j\in j(n)} P_{j,\phi}^{DER} - \sum_{\forall t\in t(n)} d_{p,t,\phi} - NL_{g,\phi}^{TR} - V_n^{r,\phi} I_n^{r,\phi} + V_n^{im,\phi} I_n^{im,\phi}, \tag{9}$$
$$\forall n \in \Upsilon, \phi \in \psi$$

$$\sum_{\forall j\in j(n)} Q_{j,\phi}^{DER} + \sum_{\forall f\in f(n)} Q_{f,\phi}^C - \sum_{\forall t\in t(n)} d_{q,t,\phi} = V_n^{im,\phi} I_n^{r,\phi} - V_n^{r,\phi} I_n^{im,\phi}, \tag{10}$$
$$\forall n \in \Upsilon, \phi \in \psi$$

The injected active power at phase $\phi$ of bus n of an unbalanced primary distribution system with DERs is formulated using (9). In (9), DERs can include PV units, demand response, and battery storage units. Usually in the United States, 5 to 10 houses are connected to a distribution transformer; in this disclosure, their electricity consumptions are assembled at the secondary side of the distribution transformer. Moreover, distribution transformers and their detailed model including no-load loss of transformers are considered. In this regard, no-load loss of distribution transformer g connected to bus n and phase $\phi$ is modeled in the active power injection constraint as shown in (9). Also, impedances of transformers are modeled in IVACOPF. It should be noted that the proposed model is solved in per-unit system, and impedances of transformers and lines are converted to per-unit values. Moreover, IVACOPF is able to model other elements of distribution systems such as voltage regulators. The injected reactive power at bus n and phase $\phi$ is shown in (10), which includes reactive power of DERs, capacitor banks output, and aggregated reactive power of consumers connected to bus n and phase $\phi$.

Voltage Magnitude Constraints $$0.95 \le V_n^\phi \le 1.05, \forall n \in \Upsilon, \phi \in \psi \tag{11}$$

$$V_n^\phi = \sqrt{V_n^{r,\phi^2} + V_n^{im,\phi^2}}, \forall n \in \Upsilon, \phi \in \psi \tag{12}$$

The voltage magnitude constraints for bus n at phase $\phi$ are given in (11)-(12) based on American National Standards Institute (ANSI) standard.

Thermal Line Limit Constraint $$I_{n,m}^{r,\phi^2} + I_{n,m}^{im,\phi^2} \le I_{n,m}^{max,\phi^2}, \forall \phi \in \psi \tag{13}$$

The current on each phase of a distribution line connecting bus n to bus m is restrained using (13).

B. Convex IVACOPF Model

This section presents a linear approximation of the nonlinear IVACOPF model. In the nonlinear IVACOPF model presented in Section II. A, the constraints, which apply all throughout the distribution network including line current flow, are linear and convex. The nonlinear and nonconvex constraints, which are net injection of active and reactive power (i.e., (9)-(10)) and voltage magnitude (i.e., (12)) constraints, are isolated at each node. The linear approximation of these three constraints are presented in the following. The objective function of the convex IVACOPF problem is shown in (14), which is similar to (1). The objective function of the convex IVACOPF problem is subject to constraints (4)-(5), (7)-(8), (11), (13), (15)-(17).

$$\text{min/max } f(I, V, P, Q) \tag{14}$$

Linear Power Balance Constraints $$\sum_{\forall j \in j(n)} P_{j,\phi}^{DER} - \sum_{\forall t \in t(n)} d_{p,t,\phi} - NL_{g,\phi}^{TR} = \underline{V_{n,it-1}^{r,\phi}} I_n^{r,\phi} + \underline{V_{n,it-1}^{im,\phi}} I_n^{im,\phi} + \tag{15}$$

$$\underline{I_{n,it-1}^{r,\phi}} V_n^{r,\phi} + \underline{I_{n,it-1}^{im,\phi}} V_n^{im,\phi} - \underline{V_{n,it-1}^{r,\phi} I_{n,it-1}^{r,\phi}} - \underline{V_{n,it-1}^{im,\phi} I_{n,it-1}^{im,\phi}}, \forall n \in \Upsilon, \phi \in \psi$$

10

-continued $$\sum_{\forall j \in j(n)} Q_{j,\phi}^{DER} + \sum_{\forall f \in f(n)} Q_{f,\phi}^C - \sum_{\forall t \in t(n)} d_{q,t,\phi} = \tag{16}$$

$$\underline{V_{n,it-1}^{im,\phi}} I_n^{r,\phi} - \underline{V_{n,it-1}^{r,\phi}} I_n^{im,\phi} + \underline{I_{n,it-1}^{r,\phi}} V_n^{im,\phi} - \underline{I_{n,it-1}^{im,\phi}} V_n^{r,\phi} -$$

$$\underline{V_{n,it-1}^{im,\phi} I_{n,it-1}^{r,\phi}} + \underline{V_{n,it-1}^{r,\phi} I_{n,it-1}^{im,\phi}}, \forall n \in \Upsilon, \phi \in \psi$$

The linear models of nonlinear active and reactive power balance constraints, i.e., (9)-(10), for each node of a distribution system are defined in (15)-(16), respectively. The linear power balance constraints of the convex IVACOPF approach (i.e., (15)-(16)) are obtained by applying first-order approximation of Taylor series. Using outputs of the previous iteration, the values of $$\underline{V_{n,it-1}^{r,\phi}}, \underline{V_{n,it-1}^{im,\phi}}, \underline{I_{n,it-1}^{r,\phi}}, \underline{I_{n,it-1}^{im,\phi}}$$

are updated in iteration it. The first iteration is solved with flat start point, i.e., voltage magnitude of 1 pu and voltage angles of 0, 120, −120 degrees for phases a, b, and c, respectively. In order to further enhance the accuracy of the model, the values of $$\underline{V_{n,it-1}^{r,\phi}}, \underline{V_{n,it-1}^{im,\phi}}, \underline{I_{n,it-1}^{r,\phi}}, \underline{I_{n,it-1}^{im,\phi}}$$

in the first iteration can be selected based on historical data (e.g., associated values from prior time intervals) or machine learning approaches.

Voltage-Magnitude Constraint $$V_n^\phi = \frac{\underline{V_{n,it-1}^{r,\phi}}}{\sqrt{\underline{V_{n,it-1}^{r,\phi^2} + V_{n,it-1}^{im,\phi^2}}}} V_n^{r,\phi} + \frac{\underline{V_{n,it-1}^{im,\phi}}}{\sqrt{\underline{V_{n,it-1}^{r,\phi^2} + V_{n,it-1}^{im,\phi^2}}}} V_n^{im,\phi}, \forall \phi \in \psi, n \in \Upsilon \tag{17}$$

The voltage magnitude constraint in the convex IVACOPF model is derived by linearizing (12) using Taylor series approximation as shown in (17).

It should be noted that the accuracy of the convex IVACOPF model can be increased by solving it iteratively until a stop criterion, e.g., number of iterations or small linearization error, is satisfied. Following metrics in (18)-(20) are defined for considering linearization error as stop criterion. In (18), the maximum absolute active power balance (MAPB) constraint linearization error is defined as the maximum absolute error between right sides (RSs) of constraint (9) and constraint (15) among all buses and phases in the system. In other words, the difference between the linearized constraint (9) and its nonlinear form (15) is determined to obtain the error as a result of the linearization. The MAPB metric is calculated at the end of each iteration by inserting the solution of the proposed optimization model (i.e., $$V_n^{r,\phi}, V_n^{im,\phi}, I_n^{r,\phi}, \text{ and } I_n^{im,\phi})$$

into the right hand side of (9) and (15) for each bus and each phase of the network. Then, the maximum absolute error among all phase and buses is obtained. Similarly, the maximum absolute reactive power balance (MRPB) constraint linearization error is defined as (19).

$$MAPB = \max_{n \in \Upsilon, \phi \in \psi} |RS \ (\text{Eq. } 9) - RS \ (\text{Eq. } 15)| \qquad (18)$$

$$MRPB = \max_{n \in \Upsilon, \phi \in \psi} |RS \ (\text{Eq. } 10) - RS \ (\text{Eq. } 16)| \qquad (19)$$

The maximum absolute voltage magnitude (MVM) constraint error is obtained using (20). At the end of each iteration, equation (12) is calculated using solution of the model (i.e., $$V_n^{r,\phi} \text{ and } V_n^{im,\phi})$$

and is compared with $$V_n^{\phi}$$

obtained by the proposed model using (17) for each bus and phase of the network. Then, the maximum absolute error among all buses and phases is determined to evaluate the linearization error of voltage magnitude constraint.

$$MVM = \max_{n \in \Upsilon, \phi \in \psi} |(\text{Eq. } 12) - (\text{Eq. } 17)| \qquad (20)$$

One or combination of these metrics can be utilized as a stop criterion for the convex IVACOPF model. In this regard, at the end of each iteration, MAPB, MRPB, or MVM are calculated and compared with predefined thresholds. If these metrics are less than the thresholds, the algorithm will stop; otherwise, it will continue until the stop criteria are met.

III. Application of IVACOPF Model

In this disclosure, the applications of the convex IVACOPF model for DER scheduling and state estimation in distribution systems are presented in this section, respectively.

A. DERs Scheduling Based on IVACOPF Model

The DERs scheduling model based on the convex IVACOPF formulation is a convex quadratically constrained quadratic programming (QCQP), which minimizes operation cost and DERs curtailment as shown in (21). Objective function in (21) is subject to (4)-(5), (7)-(8), (11), (13), (15)(17), and (22)-(24).

$$\text{Min} \sum_{\phi \in \psi} \left( \sum_{n \in \Upsilon} \left( \sum_{\forall j \in j(n)} c_j^{DER} P_{j,\phi}^{DER} \right) + \right. \qquad (21)$$
$$\left. P_{n,\phi}^s c_n^s + \sum_{n \in \Upsilon} \sum_{\forall j \in j(n)} \left( P_{j,\phi}^{DER} - P_{j,\phi}^{DER,max} \right)^2 \right)$$

The active and reactive power constraints for DERs in an unbalanced distribution system are shown in (22)-(24).

$$Q_{j,\phi}^{DER^2} + P_{j,\phi}^{DER^2} \leq \left( S_{j,\phi}^{DER,max} \right)^2 \qquad (22)$$

$$P_{j,\phi}^{DER} \leq P_{j,\phi}^{DER,max} \qquad (23)$$

$$-S_{j,\phi}^{DER,max} \leq Q_{j,\phi}^{DER} \leq S_{j,\phi}^{DER,max} \qquad (24)$$

According to IEEE 1547-2018 standard, DERs with smart inverters can provide voltage regulation and reactive power support. Controller setting of DERs with smart inverters such as Volt-VAr and Volt-Watt can be embedded in the approach outlined herein to model the active and reactive power outputs of DERs with smart inverters.

B. Distribution State Estimation Based on Convex IVA-COPF Model

In this section, a state estimation model for an unbalanced distribution system is based on the convex IVACOPF model as a quadratic programming (QP) and linear programming (LP) models. The QP-based formulation of the state estimation is presented in (25).

$$\text{Min} \sum_{e=1}^{E} w_e (h_e(f) - z_e)^2 \qquad (25)$$

Subject to: (4) – (5), (7) – (8), (15) – (16)

where $z_e$ is measurement of sensor e, and $h_e(f)$ is linear and a function of states of the system associated with the sensors' measurements (e.g., active power measurement of smart meters, micro-PMUs).

Moreover, the choice of absolute norm for the objective function is presented in the model of (26).

$$\min \sum_{e=1}^{E} w_e (|h_e(f) - z_e|) \qquad (26)$$

Subject to: (4) – (5), (7) – (8), (15) – (16)

The absolute objective function is nonlinear but it can be easily linearized by adding auxiliary variables and constraints as shown in (27)-(29).

$$\min \sum_{e=1}^{E} w_e (\gamma_e + \beta_e) \qquad (27)$$

Subject to: (4) – (5), (7) – (8), (15) – (16), (28) – (29)

$$(h_e(f) - z_e) = \gamma_e - \beta_e, \ \forall \ e \in \Gamma = \{1, 2, \dots, E\} \qquad (28)$$

$$\gamma_e, \beta_e \geq 0, \ \forall \ e \in \Gamma = \{1, 2, \dots, E\} \qquad (29)$$

Smart meters measure average active power and/or the consumption of electric energy. However, currently, commonly used smart meters do not measure reactive power consumption. The practical consideration of lack of provision of reactive power by smart meters is addressed with including (30) in the state estimation problem.

$$AP_x \frac{\sqrt{1 - PF_{x,max}^2}}{PF_{x,max}} \leq Q_x \leq AP_x \frac{\sqrt{1 - PF_{x,min}^2}}{PF_{x,min}} \qquad (30)$$

where $AP_x$ is the average active power of the smart meter x. $PF_{x,max}$ and $PF_{x,min}$ are the typical maximum and minimum power factor (e.g., 0.99 and 0.9) of each load, respectively.

C. Droop Setting Optimization of Volt-Var Controllers of PV Smart Inverters in Unbalanced Distribution Networks Fast voltage fluctuation and violation issues caused by high penetration levels of distributed energy resources (DERs), especially residential solar photovoltaic (PV) generation, cannot be easily coped with traditional Volt VAr control devices. Available active and reactive power outputs of PV smart inverters are optimally dispatched in literature at the system level without considering the PV smart inverter's internal Q-V droop control characteristics as defined in IEEE 1547-2018 standard. Therefore, the scheduled reactive power from the OPF solution for a specific PV smart inverter may not be generated since the smart inverter's reactive power output varies with its local voltage magnitude. A novel distribution system operational scheduling strategy is proposed to optimally schedule the DERs with the objective of minimizing the total operational cost while keeping the system voltage at the acceptable range. The proposed scheduling strategy is modeled using AC optimal power flow based on current-voltage (IVACOPF) formulation and includes a detailed representation of Volt-VAr droop controller of mixed-phase distributed PV smart inverters. In order to enhance the accuracy of Volt-Var controller modeling of PV smart inverters, the setpoints of QV curve of each individual PV smart inverter are optimized to achieve accurate local as well as system-level voltage regulation in an unbalanced distribution system. A set of novel mixed-integer linear constraints are developed to formulate the Q-V characteristics of Volt-VAr controllers of distributed PV smart inverters using the Big-M method and Taylor expansion to present the piecewise Volt-VAr droop function based on the IEEE 1547-2018 standard.

TABLE 2

Droop Setting Optimization Nomenclature

Table 2.1: Sets and Indices (Droop Setting Optimization)

| | |
|---|---|
| $\mathcal{J}$ /n, m | Set/Index for buses |
| $\mathcal{H}$/$\ell$ | Set/Index of lines |
| $\mathcal{H}$ '/$\mathcal{H}$ " | Set of lines with/without switch |
| $\psi$/$\phi$ | Set/Index of phases |

Table 2.2: Parameters and Constants (Droop Setting Optimization)

| | |
|---|---|
| $R_\ell^{\phi,p}/X_\ell^{\phi,p}$ | Resistance/Reactance of line & between phases $\phi$ and p |
| $P_{r,\phi}^{TR}$ | No load loss of transformer r at phase $\phi$ |
| M | A large positive number |

Table 2.3: Variable Parameters (Droop Setting Optimization)

| | |
|---|---|
| $I_\ell^{r,\phi}/I_\ell^{im,\phi}$ | Real/Imaginary part of current in line $\ell$ and phase $\phi$ |
| $V_n^\phi$ | Voltage at bus n and phase $\phi$ |
| $V_n^{r,\phi}/V_n^{im,\phi}$ | Real/ Imaginary part of voltage at bus n and phase $\phi$ |
| $I_n^{r,\phi}/I_n^{im,\phi}$ | Real/Imaginary part of current injection at bus n and phase $\phi$ |
| $P_{g,\phi}^{PV}/Q_{g,\phi}^{PV}$ | Active/Reactive power of PV g at phase $\phi$ |
| $d_{p,l,\phi}$ | Active power of load l at phase $\phi$ |
| $d_{q,l,\phi}$ | Reactive power of load l at phase $\phi$ |

TABLE 2-continued

Droop Setting Optimization Nomenclature

| | |
|---|---|
| $Q_{c,\phi}^c$ | Reactive power of capacitor unit c at phase $\phi$ |
| $u_\ell^\phi$ | Status of switch of line $\ell$ at phase $\phi$ |
| $\Lambda_\ell^k$ | Auxiliary binary variable |

C.1. Linearized IV-Based AC Power Flow Constraints a) Line Flow Constraints:

$$V_{\ell_o,p}^r - V_{\ell_e,p}^r = \sum_{\phi\in\varphi(\ell)} R_{\ell,p,\phi}\left(I_{\ell,\phi}^r + \sum_{k\in\varphi(\ell)} \mathcal{Y}_{\ell,\phi,k} V_{\ell_o,k}^{im}\right) - \tag{C1}$$
$$\sum_{\phi\in\varphi(\ell)} X_{\ell,p,\phi}\left(I_{\ell,\phi}^{im} - \sum_{k\in\varphi(\ell)} \mathcal{Y}_{\ell,\phi,k} V_{\ell_o,k}^r\right), \forall (l, p)\in\Omega_{\mathcal{L}}$$

$$V_{\ell_o,p}^{im} - V_{\ell_e,p}^{im} = \sum_{\phi\in\varphi(\ell)} R_{\ell,p,\phi}\left(I_{\ell,\phi}^{im} + \sum_{k\in\varphi(\ell)} \mathcal{Y}_{\ell,\phi,k} V_{\ell_o,k}^r\right) - \tag{C2}$$
$$\sum_{\phi\in\varphi(\ell)} X_{\ell,p,\phi}\left(I_{\ell,\phi}^r - \sum_{k\in\varphi(\ell)} \mathcal{Y}_{\ell,\phi,k} V_{\ell_o,k}^{im}\right), \forall (l, p)\in\Omega_{\mathcal{L}}$$

Constraints (C1)-(C2) describe the relationship of line current and corresponding bus voltage difference over a distribution line connecting bus $\ell_o$ to bus $\ell_e$ considering the impact of the line's self and mutual impedances and admittances.

b) Current Injection Constraints:

$$I_{i,p}^{In,r} = \sum_{(\ell,p)\in\mathcal{L}_O(i)} I_{\ell,p}^r - \sum_{(\ell,p)\in\mathcal{L}_E(i)} I_{\ell,p}^r, \forall ((i, p)\in\Omega_B \tag{C3}$$

$$I_{i,p}^{In,im} = \sum_{(\ell,p)\in\mathcal{L}_O(i)} I_{\ell,p}^{im} - \sum_{(\ell,p)\in\mathcal{L}_E(i)} I_{\ell,p}^{im}, \forall (i, p)\in\Omega_B \tag{C4}$$

The injected real and imaginary parts of current at each bus are expressed as (C3)-(C4).

c) Linearized Power Balance Constraints:

$$\sum_{\substack{\forall(n,p)\in\Omega_S\\n=i}} P_{n,p}^S + \sum_{\substack{\forall(k,p)\in\Omega_G\\k=i}} P_{k,p}^G + \sum_{\substack{\forall(g,p)\in\Omega_{P_V}\\g=i}} P_{g,p}^{pv} + \sum_{\substack{\forall(g,p)\in\Omega_{P_O}\\g=i}} \overline{P}_{g,p}^{pv} - \tag{C5}$$
$$\sum_{\substack{\forall(d,p)\in\Omega_D\\d=i}} P_{d,p}^D - \sum_{\substack{\forall(m,p)\in\Omega_T\\m=i}} P_{m,p}^{Tr} = \hat{V}_{i,p,t}^r I_{i,p}^{In,r} + \hat{I}_{i,p,t}^{In,r} V_{i,p}^r +$$
$$\hat{V}_{i,p,t}^{im} I_{i,p}^{In,im} + \hat{I}_{i,p,t}^{In,im} V_{i,p}^{im} - \hat{V}_{i,p,t}^r \hat{I}_{i,p,t}^{In,r} - \hat{V}_{i,p,t}^{im} \hat{I}_{i,p,t}^{In,im}, \forall (i, p)\in\Omega_B$$

$$\sum_{\substack{\forall(n,p)\in\Omega_S\\n=i}} Q_{n,p}^S + + \sum_{\substack{\forall(k,p)\in\Omega_G\\k=i}} Q_{k,p}^G + \sum_{\substack{\forall(g,p)\in\Omega_{PV_V}\\g=i}} Q_{g,p}^{pv} - \tag{C6}$$
$$\sum_{\substack{\forall(d,p)\in\Omega_D\\d=i}} Q_{d,p}^D + \sum_{\substack{\forall(c,p)\in\Omega_C\\c=i}} Q_{c,p}^C = \hat{V}_{i,p,t}^{im} I_{i,p}^{In,r} - \hat{V}_{i,p,t}^r I_{i,p}^{In,im} +$$
$$\hat{I}_{i,p,t}^{In,r} V_{i,p}^{im} - \hat{I}_{i,p,t}^{In,im} V_{i,p}^r - \hat{V}_{i,p,t}^{im} \hat{I}_{i,p}^{In,r} - \hat{V}_{i,p,t}^r \hat{I}_{i,p,t}^{In,im}, \forall (i, p)\in\Omega_B$$

In constraints (C5)-(C6), $$\left(\hat{V}_{i,p,t}^{r,s}, \hat{V}_{i,p,t}^{im,s}, \hat{I}_{i,p,t}^{in,r,s}, \hat{I}_{i,p,t}^{in,im,s}\right)$$

are used as the first-order approximation parameters of Taylor's series expansion and updated iteratively.

d) Voltage Magnitude Constraints

The linear approximation of the voltage magnitude, which is expressed by a nonlinear function of the real part and the imaginary part of voltage, can be reformulated by the similar first-order Taylor-series expansion method:

$$V_{i,p}^m = \frac{\hat{V}_{i,p,t}^r, V_{i,p}^r}{\sqrt{\hat{V}_{i,p,t}^{r}{}^2 + \hat{V}_{i,p,t}^{im}{}^2}} + \frac{\hat{V}_{i,p,t}^{im}, V_{i,p}^{im}}{\sqrt{\hat{V}_{i,p,t}^{r}{}^2 + \hat{V}_{i,p,t}^{im}{}^2}}, \ \forall (i, p) \in \Omega_B \tag{C7}$$

$$V^{min} \le V_{i,p}^m \le V^{max}, \ \forall (i, p) \in \Omega_B \tag{C8}$$

Constraint (C8) bounds the voltage magnitudes in the normal operating range.

C.2. The Q-V Characteristic of Smart PV Inverters with Volt-VAr Control

Figure 1B:
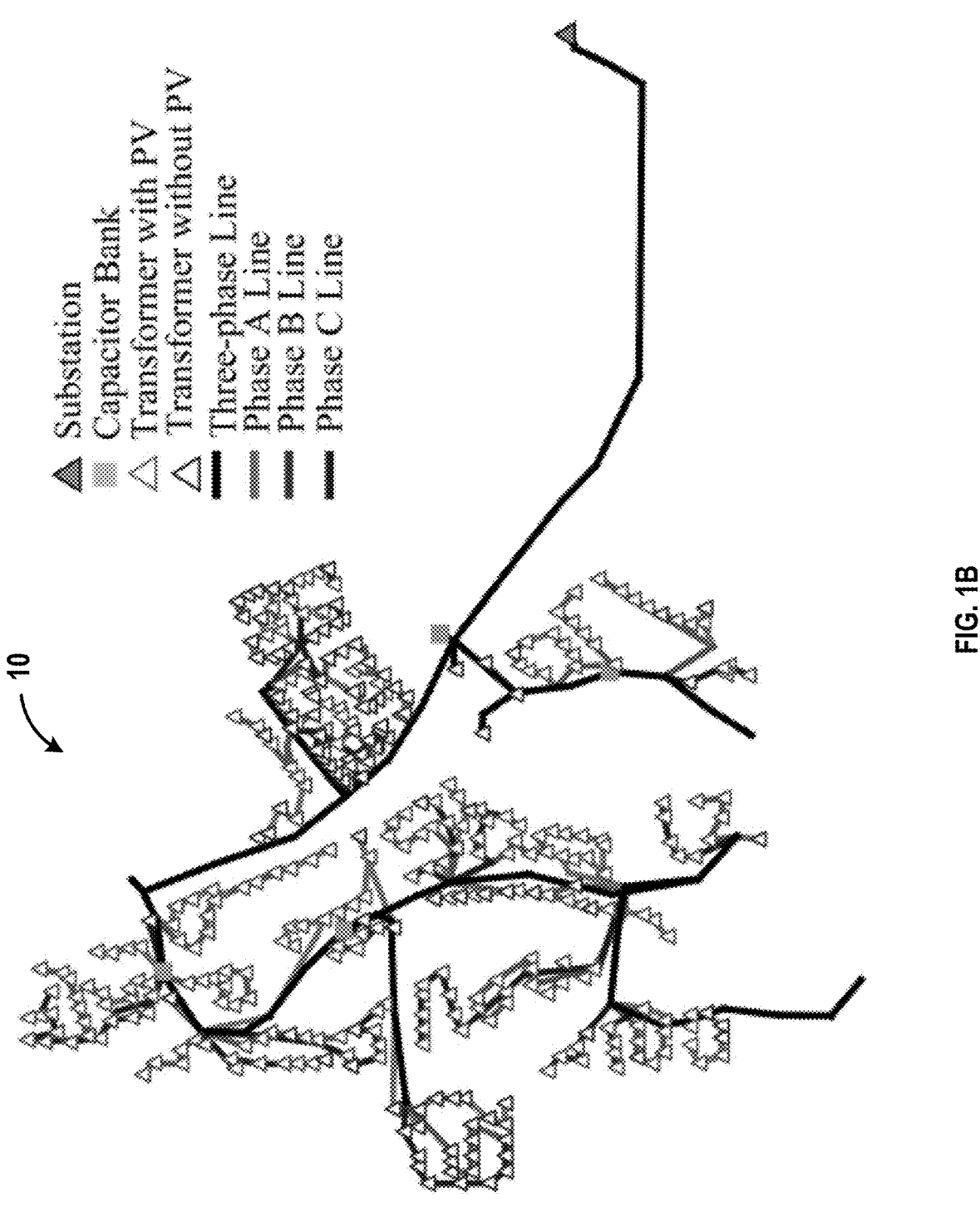
FIG. 1B is a graphical representation showing an example topology of a local utility distribution feeder.
Figure 1C:
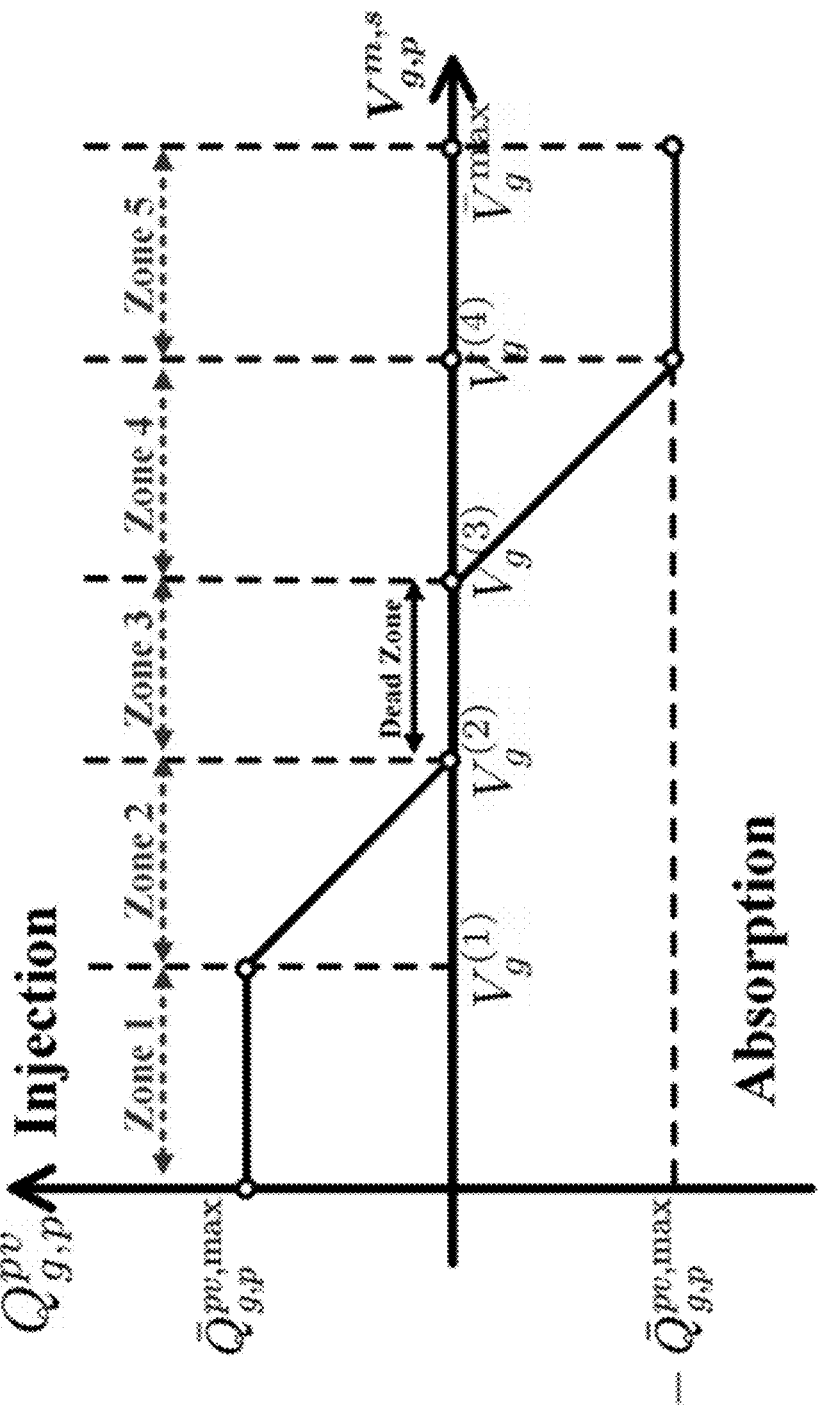
FIG. 1C is a graphical representation showing Q-V characteristics of a PV unit with Volt-VAr Control.

According to the IEEE 1547-2018 standard, a PV smart inverter in Volt-VAr control mode with VAr priority should follow the Q-V curve depicted in FIG. 1C. This droop control can adjust the generation or absorption of reactive power to regulate the local voltage and be realized by implementing a piece-wise linear Q-V curve constraint as shown in (C9).

$$Q_{g,p}^{pv} = \begin{cases} Q_{g,p}^{pv,max} & \text{if } V_{g,p}^{m,s} \le V_{g,p}^{(1)} \\ \dfrac{\overline{Q}_{g,p}^{pv,max}}{V_{g,p}^{(1)} - \overline{V}_{g,p}^{min}}\left(V_{g,p}^{(1)} - V_{g,p}^{m,s}\right) & \text{if } V_{g,p}^{(1)} \le V_{g,p}^m \le V_{g,p}^{(2)} \\ 0 & \text{if } V_{g,p}^{(2)} \le V_{g,p}^m \le V_{g,p}^{(3)} \\ \dfrac{\overline{Q}_{g,p}^{pv,max}}{V_{g,p}^{(2)} - V_{g,p}^{(3)}}\left(V_{g,p}^m - V_{g,p}^{(2)}\right) & \text{if } V_{g,p}^{(3)} \le V_{g,p}^m \le V_{g,p}^{(4)} \\ -Q_{g,p}^{pv,max} & \text{if } V_{g,p}^{(4)} \le V_{g,p}^m \le \overline{V}_{g,p}^{max} \end{cases} \tag{C9}$$

where $$V_{g,p}^{(1)}, V_{g,p}^{(2)}, V_{g,p}^{(3)}, V_{g,p}^{(4)}, \text{ and } Q_{g,p}^{pv,max}$$

are the setting points of the Q-V curves. If these four setting points are set to their default values, smart PV inverter's ability to regulate local voltage through adjusting the amount of reactive power will be limited. In this paper, we co-optimize these four setpoints with Q-V curve of Volt-VAr control together based on allowable range of IEEE 1547-2018 standard to increase the volt-var control's flexibility. Firstly, we propose a mixed-integer linear programming formulation of (C9) using the Big-M method. Secondly, the nonlinear items in the second and third operating zones of the Q-V curve are linearized by the first-order approximation of the Taylor expansion. The detailed constraints of formulating the Q-V curve of a PV smart invert with co-optimized setting points is presented as follows:

$$V_{g,p}^m \le V_{g,p}^{(1)} + Mz_{g,p}^{(1)}, \ \forall (g, p) \in \Omega_{PV_v} \tag{C10}$$

-continued $$-Mz_{g,p}^{(1)} \le Q_{g,p}^{pv} - \overline{Q}_{g,p}^{pv,max} \le Mz_{g,p}^{(1)}, \ \forall (g, p) \in \Omega_{PV_v} \tag{C11}$$

$$-Mz_{g,p}^{(2)} + V_{g,p}^{(1)} \le V_{g,p}^m \le V_{g,p}^{(2)} + Mz_{g,p}^{(2)}, \ \forall (g, p) \in \Omega_{PV_v} \tag{C12}$$

$$-Mz_{g,p}^{(2)} \le Q_{g,p}^{pv} - \frac{\overline{V}_{g,p,t}^{(2)} - \overline{V}_{g,p,t}^m}{\overline{V}_{g,p,t}^{(2)} - \overline{V}_{g,p,t}^{(1)}}\overline{Q}_{g,p}^{pv,max} + \tag{C13}$$

$$\frac{\overline{Q}_{g,p,t}^{pv,max}}{\overline{V}_{g,p,t}^{(2)} - \overline{V}_{g,p,t}^{(1)}}V_{g,p}^m - \overline{Q}_{g,p}^{pv,max}\frac{\left(\overline{V}_{g,p,t}^{(2)} - \overline{V}_{g,p,t}^m\right)}{\left(\overline{V}_{g,p,t}^{(2)} - \overline{V}_{g,p,t}^{(1)}\right)^2}V_{g,p}^{(1)} +$$

$$\overline{Q}_{g,p}^{pv,max}\frac{\left(\overline{V}_{g,p,t}^{(1)} - \overline{V}_{g,p,t}^m\right)}{\left(\overline{V}_{g,p,t}^{(2)} - \overline{V}_{g,p,t}^{(1)}\right)^2}V_{g,p}^{(2)} \le Mz_{g,p}^{(2)}, \ \forall (g, p) \in \Omega_{PV_v}$$

$$-Mz_{g,p}^{(3)} + V_{g,p}^{(2)} \le V_{g,p}^m \le V_{g,p}^{(3)} + Mz_{g,p}^{(3)}, \ \forall (g, p) \in \Omega_{PV_v} \tag{C14}$$

$$-Mz_{g,p}^{(3)} \le Q_{g,p}^{pv} \le Mz_{g,p}^{(3)}, \ \forall (g, p) \in \Omega_{PV_v} \tag{C15}$$

$$-Mz_{g,p}^{(4)} + V_{g,p}^{(3)} \le V_{g,p}^m \le V_{g,p}^{(4)} + Mz_{g,p}^{(4)}, \ \forall (g, p) \in \Omega_{PV_v} \tag{C16}$$

$$-Mz_{g,p}^{(4)} \le Q_{g,p}^{pv} - \frac{\overline{V}_{g,p,t}^m - \overline{V}_{g,p,t}^{(3)}}{\overline{V}_{g,p,t}^{(3)} - \overline{V}_{g,p,t}^{(4)}}Q_{g,p}^{pv,max} - \tag{C17}$$

$$\frac{\overline{Q}_{g,p,t}^{pv,max}}{\overline{V}_{g,p,t}^{(3)} - \overline{V}_{g,p,t}^{(4)}}V_{g,p}^m + \overline{Q}_{g,p,t}^{pv,max}\frac{\left(\overline{V}_{g,p,t}^m - \overline{V}_{g,p,t}^{(4)}\right)}{\left(\overline{V}_{g,p,t}^{(3)} - \overline{V}_{g,p,t}^{(4)}\right)^2}V_{g,p}^{(3)} -$$

$$\overline{Q}_{g,p,t}^{pv,max}\frac{\left(\overline{V}_{g,p,t}^m - \overline{V}_{g,p,t}^{(3)}\right)}{\left(\overline{V}_{g,p,t}^{(3)} - \overline{V}_{g,p,t}^{(4)}\right)^2}V_{g,p}^{(4)} \le Mz_{g,p}^{(4)}, \ \forall (g, p) \in \Omega_{PV_v}$$

$$-Mz_{g,p}^{(5)} + V_{g,p}^{(4)} \le V_{g,p}^m, \ \forall (g, p) \in \Omega_{PV_v} \tag{C18}$$

$$-Mz_{g,p}^{(5)} \le Q_{g,p}^{pv} + Q_{g,p}^{pv,max} \le Mz_{g,p}^{(5)}, \ \forall (g, p) \in \Omega_{PV_v} \tag{C19}$$

$$\overline{V}^{ref} - 0.18 \le V_{g,p}^{(1)} \le V_{g,p}^{(2)} - 0.02, \ \forall (g, p) \in \Omega_{PV_v} \tag{C20}$$

$$\overline{V}^{ref} - 0.03 \le V_{g,p}^{(2)} \le \overline{V}^{ref}, \ \forall (g, p) \in \Omega_{PV_v} \tag{C21}$$

$$\overline{V}^{ref} \le V_{g,p}^{(3)} \le \overline{V}^{ref} + 0.03, \ \forall (g, p) \in \Omega_{PV_v} \tag{C22}$$

$$\overline{V}^{ref} + 0.02 \le V_{g,p}^{(4)} \le \overline{V}^{ref} + 0.18, \ \forall (g, p) \in \Omega_{PV_v} \tag{C23}$$

$$-Q_{g,p}^{pv,max} \le Q_{g,p}^{pv} \le Q_{g,p}^{pv,max}, \ \forall (g, p) \in \Omega_{PV_v} \tag{C24}$$

$$0 \le Q_{g,p}^{pv,max} \le \frac{P_{g,p}^{pv,max}}{PF_{g,p}^{min}}, \ \forall (g, p) \in \Omega_{PV_v} \tag{C25}$$

$$P_{g,p}^{pv} \le \overline{P}_{g,p}^{pv}, \ \forall (g, p) \in \Omega_{PV_v} \tag{C26}$$

$$\left(P_{g,p}^{pv}\right)^2 + \left(Q_{g,p}^{pv}\right)^2 \le \left(\frac{P_{g,p}^{pv,max}}{PF_{g,p}^{min}}\right)^2, \ \forall (g, p) \in \Omega_{PV_v} \tag{C27}$$

D. Computer-Implemented System

D.1—Computing Device

Figure 2:
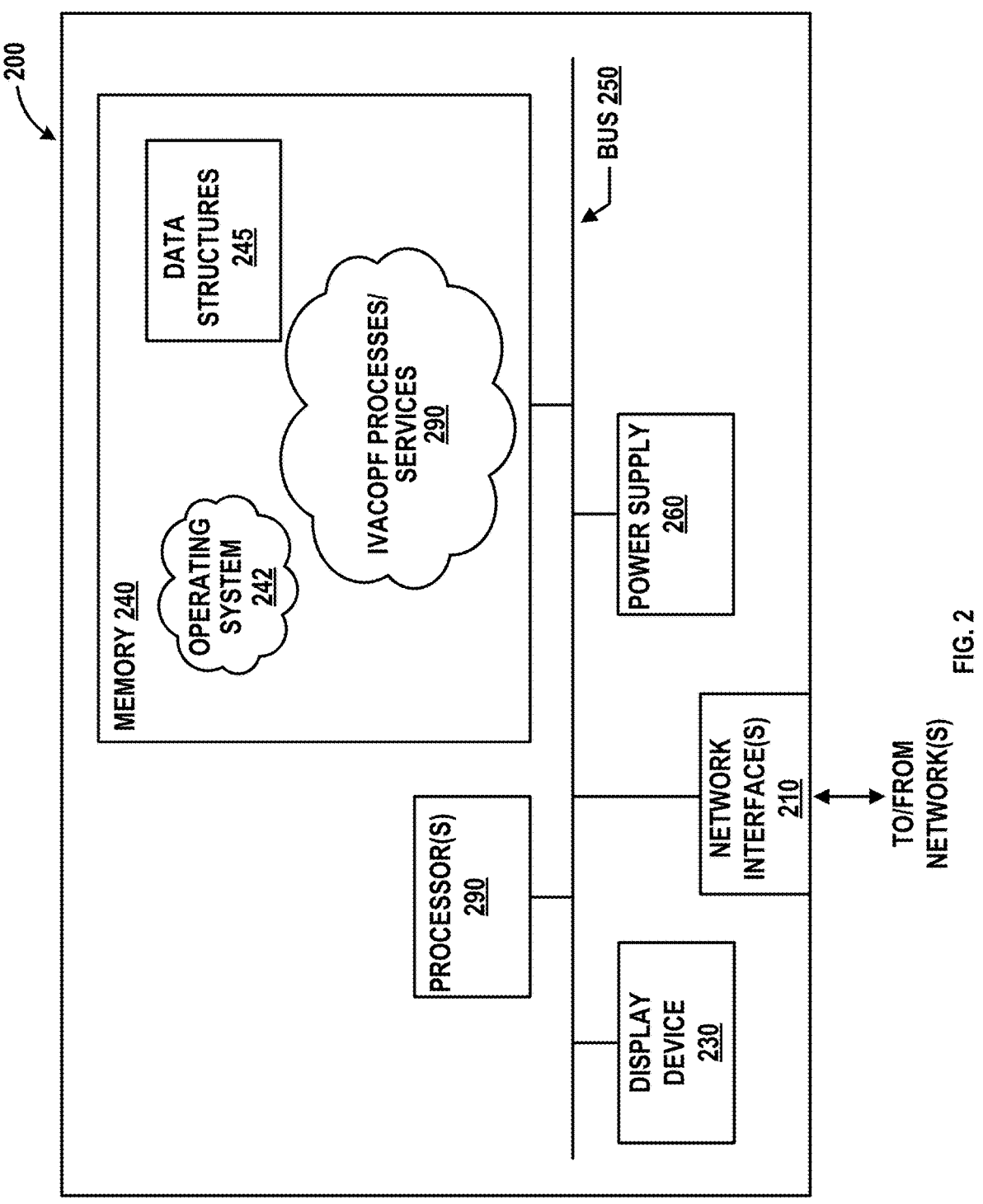
FIG. 2 is a simplified diagram showing an example computing device for implementation of the modeling systems outlined herein.

FIG. 2 is a schematic block diagram of an example device 200 that may be used with one or more embodiments described herein, e.g., for modeling an unbalanced distribution system.

Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.). Device 200 can also include or otherwise communicate with a display device 230 for displaying information pertaining to IVACOPF and/or the unbalanced distribution system, including optimization results and graphical representations.

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 160 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches). Memory 240 can include instructions executable by the processor 220 that, when executed by the processor 220, cause the processor 220 to implement aspects of the systems and the methods outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes device 100 by, inter alia, invoking operations in support of software processes and/or services executing on the device. These software processes and/or services may include IVACOPF processes/services 290, which can include aspects of methods and/or implementations of various modules described herein. Note that while IVACOPF processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the IVACOPF processes/services 290 is shown as a stand-alone process, those skilled in the art will appreciate that this process may be executed as a routine or module within other processes.

D.2—Computer-Implemented Methods

A method 300 outlined herein and shown in FIGS. 3A-3C for unbalanced AC optimal power flow modeling may be implemented using device 200 (e.g., as part of IVACOPF processes/services 290 shown in FIG. 2) in accordance with the system 100 shown in FIG. 1A. The method 300 corresponds with FIGS. 1A and 2 and their corresponding discussion, as well as the Nonlinear IVACOPF model presented in section II.A and the Convex IVACOPF model presented in section II.B.

Referring to FIG. 3A, step 302 of method 300 includes accessing state data descriptive of a state of an unbalanced distribution network. Such state data can include, but is not limited to, meter/sensor readings from various components of the unbalanced distribution network that provides information about component status, current, voltage, and/or power at different locations within the unbalanced distribution network.

Step 304 of method 300 can include identifying one or more unknown parameters of a plurality of parameters of the unbalanced distribution network based on the state data. Step 304 may be performed based on the context of the IVACOPF model, such as when the IVACOPF model is used in conjunction with other systems for tasks such as but not limited to scheduling, control, optimization, monitoring, and simulation. For example, step 304 can include finding which parameters are unknown based on a set of knowns (e.g., the state data). The step of identifying the unknowns can be achieved at least in part using input from a user or another system (e.g., a function call, an input from a user specifying a point on the topology and selecting "find value", etc.). IVACOPF may also identify which values are missing from the state data. In some examples, IVACOPF may also have a subset of unknowns which are always evaluated given the state data such as reactive power or shunt admittance associated with various components of the unbalanced distribution network, as these values are not usually reported under current regimes.

Step 306 can include evaluating, based on the state data, a value of the one or more unknown parameters of the unbalanced distribution network using an objective function constrained by a set of unbalanced distribution network constraints that collectively model operation of the unbalanced distribution network, Importantly, the set of unbalanced distribution network constraints can incorporate, for a three-phase distribution line of the unbalanced distribution network that is connected to a first bus of a plurality of buses of the unbalanced distribution network: a mutual current coupling, a mutual voltage coupling, and resultant line power losses within each phase and between each respective phase of the three-phase distribution line; as well as a shunt admittance between the first bus and a second bus of the plurality of buses of the unbalanced distribution network.

As such, step 306 can include various sub-steps 308-314. Step 308 can include determining a mutual current coupling, a mutual voltage coupling, and resultant line power losses within each phase and between each respective phase of the three-phase distribution line. Step 310 can include determining a shunt admittance impact within each phase and between each respective phase of the three-phase distribution line.

Step 312 can include determining injected active power associated with a bus and a phase and associated with one or more of: a distributed energy resource, a customer load, a distribution transformer, and a capacitor bank of the unbalanced distribution network, where the injected active power incorporates a no-load power loss associated with the distribution transformer. The distributed energy resource includes a renewable energy resource that injects power into the unbalanced distribution network. For the Convex IVACOPF model presented in section II.B, the injected active power can be expressed as a convexified linear approximation of injected active power.

Step 314 can include determining injected reactive power associated with a bus and a phase and associated with one or more of: a distributed energy resource, a customer load, a distribution transformer, and a capacitor bank of the unbalanced distribution network, where the distributed energy resource includes a renewable energy resource that injects power into the unbalanced distribution network. For the Convex IVACOPF model presented in section II.B, the injected reactive power can be expressed as a convexified linear approximation of injected reactive power.

Following step 306 (including sub-steps 308-314), the value of the one or more unknown parameters of the unbalanced distribution network can be used in various ways depending on the context of the IVACOPF model.

Referring to FIG. 3B, steps 316-322 of method 300 may be applied when IVACOPF is used for an optimization task. Step 316 includes accessing optimization data indicative of an optimization goal for optimization of the unbalanced distribution network, the optimization data specifying the one or more unknown parameters of the unbalanced distribution network to be optimized according to one or more optimization rules. The unknown parameters can include, for example, an ideal location, quantity or capacity/rating/ size of an element of the unbalanced distribution network, droop setting values for smart PV inverters, scheduling parameters, etc. The optimization rules can include, for example, minimizing a total cost, minimizing power loss, maximizing power output, maximizing a network stability metric, keeping certain voltage, current or power values within certain range(s), etc.

Step 318 of method 300 can include iteratively simulating operation of the unbalanced distribution network based on the objective function and the set of unbalanced distribution network constraints resulting in simulation data indicative of a simulated state of the unbalanced distribution network. Step 320 of method 300 can include measuring a state of one or more components of the unbalanced distribution network based on measurements accessed by the processor from one or more components of the unbalanced distribution network. Step 322 of method 300 can include adjusting one or more parameters of the unbalanced distribution network, the objective function and/or the set of unbalanced distribution network constraints based on a difference between the simulated state of the unbalanced distribution network and the state of the unbalanced distribution network as measured.

When IVACOPF is used as part of a topology/resource optimization task, the objective function can include a formulation that optimizes a topology and/or resource mix of the unbalanced distribution network with respect to one or more resource limitations based on an estimated state of one or more components of the unbalanced distribution network with respect to the set of unbalanced distribution network constraints.

When IVACOPF is used as part of a scheduling analysis task, the objective function can include a convex quadratically constrained quadratic programming formulation that jointly determines an operation cost and distributed energy resource curtailment for optimal scheduling of distributed energy resources of the unbalanced distribution network.

When IVACOPF is used as part of a state estimation (e.g., monitoring) task, the objective function can include a quadratic programming formulation that minimizes a difference between modeled values and measured values for estimating a state of one or more components of the unbalanced distribution network. The objective function can include a formulation that determines an error of the unbalanced distribution network based on an estimated state of one or more components of the unbalanced distribution network with respect to the set of unbalanced distribution network constraints.

When IVACOPF is used as part of a planning or stability analysis task (which may overlap with the state estimation task discussed above), the objective function can model a potential outage associated with a portion of the unbalanced distribution network as a state of a switch associated with the portion of the unbalanced distribution network. In this case, evaluating the objective function enables estimation of the state of the switch based on the estimated state of one or more components of the unbalanced distribution network with respect to the set of unbalanced distribution network constraints.

Referring to FIG. 3C, steps 324 and 326 of method 300 may be applied in conjunction with the optimization task of steps 316-322 or as part of other tasks such as monitoring, simulation (e.g., for planning, stability analysis, etc) and control of one or more components of the unbalanced distribution network. Steps 324 and 326 do not necessarily need to be performed after steps 316-322 nor do they need to be performed in sequence with one another. Steps 324 and 326 may be performed individually as needed.

Step 324 of method 300 includes generating, based on the state data and based on the values of the one or more unknown parameters of the unbalanced distribution network, a graphical representation for display at a display device. The graphical representation may be in the form of a topology map showing a topology of the unbalanced distribution network and may include annotations that display values from the state data as well as values of the one or more unknown parameters evaluated during step 306 and its sub-steps 308-314. The graphical representation may also or alternatively be in the form of a plot that shows values (including projected or swept values) associated with any parameter or variable of the unbalanced distribution network. For example, network operators may be interested in voltage profiles of various components of the unbalanced distribution network; the graphical representation generated using IVACOPF may include one or more voltage profiles of a component of the unbalanced distribution network evaluated over various conditions that may be simulated using the IVACOPF model.

Step 326 of method 300 includes applying a control input to one or more components of the unbalanced distribution network based on the values of the one or more unknown parameters of the unbalanced distribution network. In some examples, this step may be performed as a result of or in conjunction with the optimization or stability analysis tasks discussed above. In some examples, the set of unbalanced distribution network constraints can incorporate, for example, a droop control constraint for a photovoltaic inverter of the unbalanced distribution network that adaptively adjusts generation or absorption of reactive power by the photovoltaic inverter based on a value of a local voltage with respect to one or more local voltage operating zones. The one or more local voltage operating zones can be adaptively adjusted based on the state data of the unbalanced distribution network.

IV. Simulation Results

In this section, first, the performance of the nonlinear and convex IVACOPF models is evaluated and compared with OpenDSS, a distribution system analysis software, and the widely used LinDistFlow model in an unbalanced distribution system. Then, the applications of the convex IVACOPF model for DERs scheduling and state estimation in an unbalanced distribution system are shown in Sections IV.B and IV.C, respectively. The data from 12.47 kV, nine km-long primary distribution feeder of a local electric utility in Arizona, USA are used for the purpose of these tests. The general information of this distribution feeder is shown in Table 3. An actual snapshot of the utility feeder representing Jul. 15, 2019, at 5 pm with 1.903 MW of total residential rooftop PV generation is used to test the models. An example topology of the feeder is shown in FIG. 1B.

TABLE 3

| Overview of the distribution feeder of a local electric utility in Arizona | |
| --- | --- |
| Number of Buses | 2100 |
| Number of Lines | 1790 |
| Number of Switch Cabinets | 23 |
| Number of Rooftop PV Units | 250 |
| Number of Capacitors | 4 |
| Number of Distribution Transformers | 371 |
| Number of Primary Load Buses | 342 |

A. Comparing Nonlinear and Convex IVACOPF Models with LinDistFlow and OpenDSS The performance of the nonlinear and convex IVACOPF models is compared with the three-phase LinDistFlow model using the local utility distribution network in this section. The main difference between the LinDistFlow model and other OPF models is the expression of Kirchhoff's voltage law (KVL). In the LinDistFlow model, the KVL constraint is formulated as follows:

$$U_n^\phi - U_n^\phi = \sum_{k \in \psi} \left( R_{n,m,\phi,k}^p P_{n,m,k} + X_{n,m,\phi,k}^Q Q_{n,m,k} \right), \forall \phi \in \psi \quad (31)$$

$$0.95^2 \le U_n^\phi \le 1.05^2, \forall \phi \in \psi, n \in \Upsilon \quad (32)$$

where $$U_n^\phi = \left( V_n^\phi \right)^2 \quad (35)$$

represents the squared voltage magnitude, and its limit is restricted on (32). The line active and reactive power are $P_{n,m,k}$ and $Q_{n,m,k}$ respectively. This KVL constraint neglects loss terms in the line power flow and assumes the ratio of voltage phasors are constant $$(V_n^a V_n^{b-1} = V_n^b V_n^{c-1}$$

$\approx 1\angle 120°$ and $$V_n^a V_n^{c-1}$$

$\approx 1\angle 240°$, which reflects in the equivalent impedance $Z_{n,m,\phi,k}=$ $$R_{n,m,\phi,k}^p + jX_{n,m,\phi,k}^Q.$$

These two strong assumptions can help LinDistFlow to obtain an approximate power flow solution fast, however the solution may not be accurate enough for an unbalanced distribution system. Also, the assumption of considering variable $$U_n^\phi$$

does not allow to model voltage magnitude and angle in the LinDistFlow model. As a result, it is hard to utilize the LinDistFlow model for Volt-VAr optimization studies in unbalanced distribution systems as their key variable is the voltage phasor.

The accuracy of the models is examined by comparing the results with power flow solution of OpenDSS. Different modeling cases of the IVACOPF approach are simulated for the purpose of the comparison as follows:

Nonlinear IVACOPF with Shunt: Nonlinear IVACOPF model with considering shunt elements of the distribution lines presented in Section II.A IVACOPF without shunt: Iterative convex IVACOPF model without considering shunt elements of the distribution lines presented in Section II.B IVACOPF with shunt: Iterative convex IVACOPF model with considering shunt elements of the distribution lines presented in Section II.B The combination of three stop criteria for IVACOPF with and without shunt modeling are considered based on (18)-(20), which are MAPB=0.015 KW, MRPB=0.015 Kvar, and MVM=10-5). These two models will converge whenever all above stop criteria are met. Table 4 compares the obtained active and reactive power output of the substation bus by each of the aforementioned models as well as LinDistFlow model with OpenDSS. In Table 4, the active and reactive power at substation bus for each phase is given for each model. Also, the percentage error of active and reactive power of each model compared to OpenDSS is presented in Table 4 for each phase in "( )" and is obtained using (33).

$$\text{Error } (\%) = \frac{(OpenDSS \text{ power} - \text{power obtained by Model})}{OpenDSS \text{ power}} \times 100 \quad (33)$$

TABLE 4

| | | | Nonlinear IVACOPF with Shunt | | IVACOPF without shunt | | IVACOPF with shunt | | LinDistFlow [20] | |
| --- | --- | --- | --- | --- | --- | --- | --- | --- | --- | --- |
| | | | P [kW] | Q [kVAR] | P [kW] | Q [kVAR] | P [kW] | Q [kVAR] | P [kW] | Q [kVAR] |
| | OpenDSS | | | | | | | | | |
| Phase | P [kW] | Q [kVAR] | (% Error) | (% Error) | (% Error) | (% Error) | (% Error) | (% Error) | (% Error) | (% Error) |
| 1 | 1857.3 | 523.1 | 1856.5 (0.043) | 523.2 (−0.017) | 1857.1 (0.012) | 687.2 (−31.380) | 1856.2 (0.061) | 523.1 (−0.009) | 1836.5 (1.118) | 658.4 (−25.877) |

Comparison of substation active and reactive power of each model with OpenDSS

TABLE 4-continued

| Comparison of substation active and reactive power of each model with OpenDSS | | | | | | | | | | |
|---|---|---|---|---|---|---|---|---|---|---|
| | | | Nonlinear IVACOPF with Shunt | | IVACOPF without shunt | | IVACOPF with shunt | | LinDistFlow [20] | |
| | OpenDSS | | P [kW] | Q [kVAR] | P [kW] | Q [kVAR] | P [kW] | Q [kVAR] | P [kW] | Q [kVAR] |
| Phase | P [kW] | Q [kVAR] | (% Error) | (% Error) | (% Error) | (% Error) | (% Error) | (% Error) | (% Error) | (% Error) |
| 2 | 2220.6 | 698.7 | 2220.5 (0.005) | 698.7 (−0.006) | 2221.6 (−0.043) | 861.5 (−23.310) | 2220.1 (0.025) | 698.1 (0.083) | 2176 (2.008) | 819.6 (−17.300) |
| 3 | 1897.6 | 568.1 | 1896.9 (0.039) | 568.1 (−0.003) | 1897.5 (0.006) | 733.5 (−29.117) | 1896.8 (0.043) | 568.1 (−0.007) | 1867.7 (1.575) | 688.9 (−21.276) |

In Table 4, Active (P) and Reactive (Q) power of substation bus obtained from OpenDSS and each model (i.e., Nonlinear IVACOPF with Shunt, IVACOPF without shunt, IVACOPF with shunt, and LinDistFlow) are presented in kW and kVAR. Also, active and reactive power error of each model is compared with OpenDSS and the associated error is presented in % (i.e., % Error=(OpenDSS-Model)×100/OpenDSS).

TABLE 5

| Simulation time comparison of different models. | |
|---|---|
| Model | Time (s) |
| Nonlinear IVACOPF with shunt | 32.56 |
| IVACOPF without shunt | 3.02 |
| IVACOPF with shunt | 3.14 |
| LinDistFlow | 1.46 |

Table 5 compares OpenDSS power simulation time of different models.

It can be seen in Table 4 that the obtained active and reactive power at substation by the Nonlinear IVACOPF model with considering shunt elements of the distribution lines matches thoroughly with those of OpenDSS and the active and reactive power errors are very small for all phases. Both methods, IVACOPF without and with shunt modeling, converge in the second iteration. By comparing the results of these two methods with those of OpenDSS in Table 4, it can be seen that both methods have very small active power error at substation bus, which shows the high accuracy of the methods for modeling active power loss. However, the reactive power error of the IVACOPF without shunt is negative and high compared to OpenDSS for each phase (i.e., −31.380%, −23.310%, and −29.117%), which shows the importance of modeling shunt capacitance of distribution line. It can be seen that reactive power error of the IVACOPF with shunt modeling is incredibly small for each phase (i.e., −0.009%, 0.083%, and −0.007%), which illustrates the effectiveness of the convex IVACOPF model in precisely modeling untransposed distribution lines with all of their series and shunt elements for each phase.

In summary, based on Table 4, the active and reactive power outputs at substation bus obtained by both nonlinear and convex IVACOPF with shunt models match perfectly with each other and those of OpenDSS. These results confirm that the IVACOPF approaches precisely formulate the system active and reactive power losses as well as all components of an unbalanced distribution system such as untransposed distribution lines and distribution transformers. Both of the nonlinear and convex IVACOPF with shunt models can be utilized by electric utility companies to model an unbalanced distribution system precisely. However, as shown in Table 5, the convex IVACOPF with shunt model is faster than the nonlinear IVACOPF with shunt. Also, according to the general mathematical optimization programming fundamentals, any nonlinear model may not converge at certain conditions. Hence, while both models are accurate and fast enough, the convex IVACOPF with shunt model may be more practical. It should be noted that the simulation time of the convex IVACOPF with shunt modeling shown in Table 5 is reported at the end of iteration 2. The simulation time of the convex IVACOPF with shunt modeling can be further enhanced by better initialization of the Taylor series points in the first iteration. As a result, the model may converge in one iteration and the simulation time will be comparable with that of LinDistFlow model. The IVACOPF algorithms show substantially smaller error in calculated substation power compared to LinDistFlow model as shown in Table 4. The active power errors of LinDistFlow model (i.e., 1.118%, 2.008%, and 1.575%) show the impact of the assumptions of LinDistFlow model for ignoring line losses. Moreover, the large negative reactive power errors of LinDistFlow model for each phase of substation bus (i.e., −25.877%, −17.3%, −21.276%) show the drawback of LinDistFlow model due to its inability to model shunt elements of distribution lines.

Figure 4:
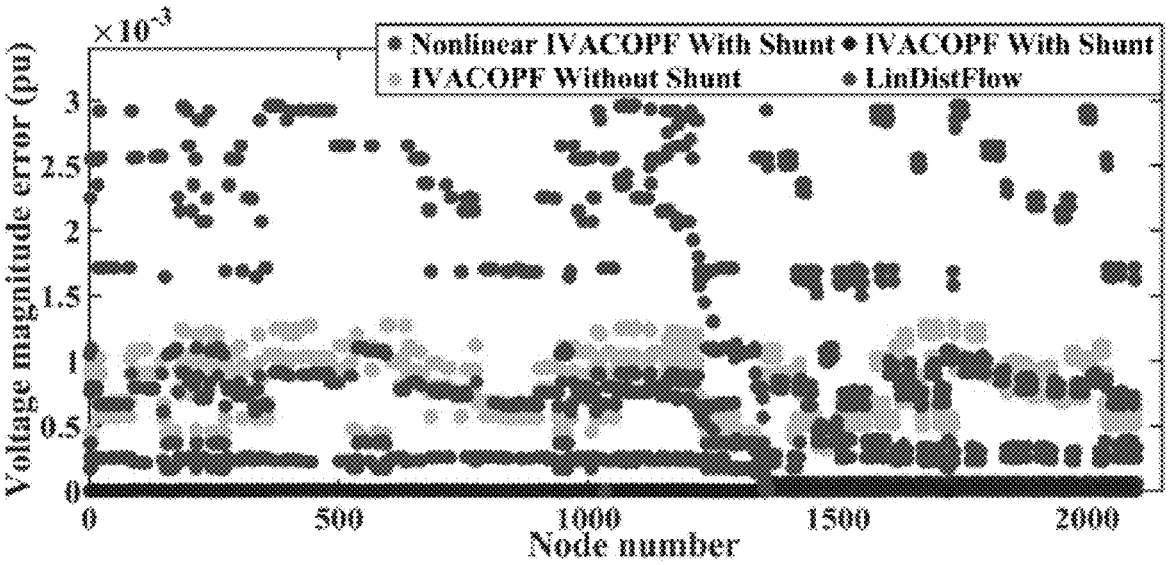
FIG. 4 is a graphical representation showing bus voltage magnitude errors for different models including nonlinear IVACOPF with shunt, IVACOPF with shunt, IVACOPF without shunt, and another model.
Figure 5:
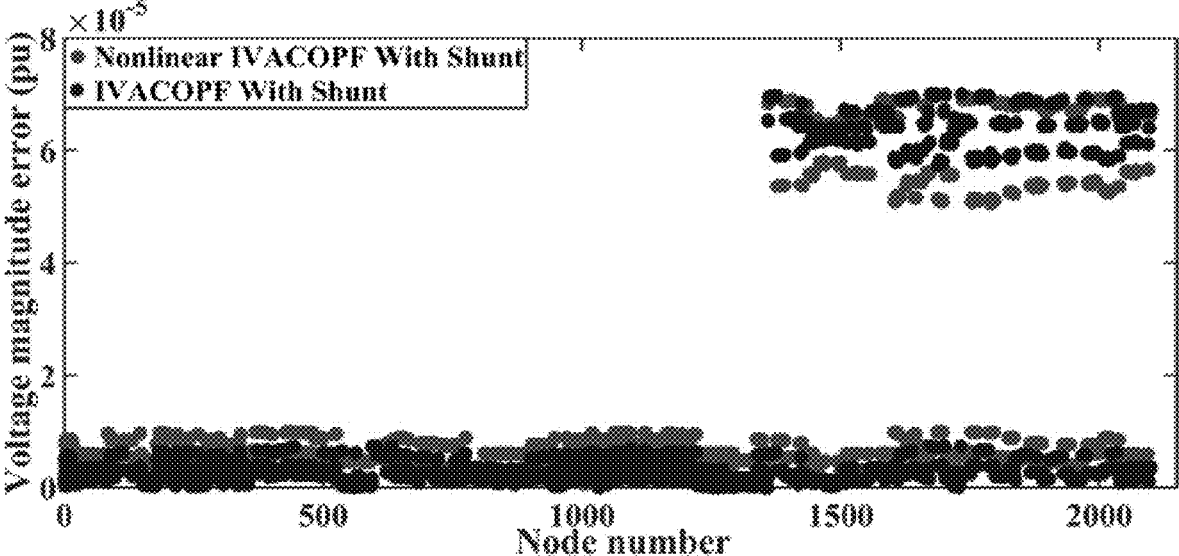
FIG. 5 is a graphical representation showing bus voltage magnitude errors for nonlinear and convex IVACOPF with and without shunt.

The absolute voltage magnitude error of each node of the system in the nonlinear and convex IVACOPF models as well as LinDistFlow model with respect to OpenDSS is shown in FIG. 4. It can be seen that the LinDistFlow model has larger error compared to the nonlinear and convex IVACOPF models. Since the nonlinear and convex IVACOPF with shunt models have significantly small voltage magnitude error as shown in FIG. 4, a zoomed in figure of voltage magnitude error of each node of the utility feeder for these models is presented in FIG. 5 to better comprehend the errors.

Figure 6:
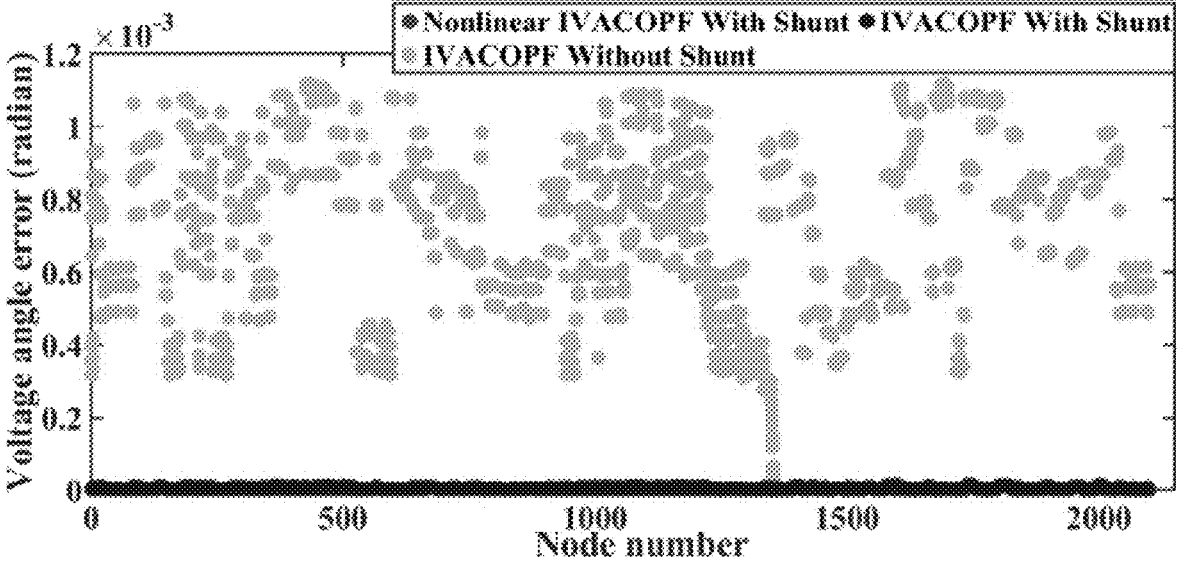
FIG. 6 is a graphical representation showing bus voltage angle errors for nonlinear and convex IVACOPF, as well as IVACOPF with and without shunt.
Figure 7:
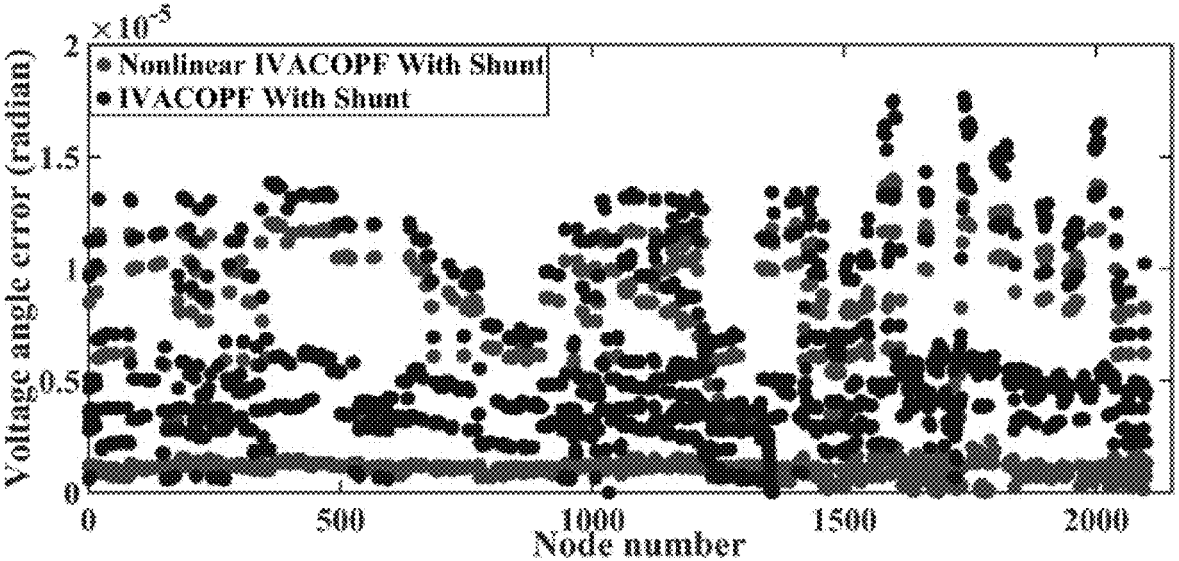
FIG. 7 is a graphical representation showing bus voltage angle errors for nonlinear and convex IVACOPF with and without shunt.

In FIG. 6, the absolute voltage angle error of each node of the test system is given for the nonlinear and convex IVACOPF models with respect to the OpenDSS. It should be noted that the LinDistFlow model ignores voltage angle modeling and as a result it is not shown in FIG. 6. This illustrates another limitation of the LinDistFlow model for modeling unbalanced distribution networks. According to FIG. 6, the voltage angle errors of all nonlinear and convex IVACOPF models are reasonably small, while the nonlinear and convex IVACOPF with shunt models have incredibly small error and are further shown in FIG. 7.

To further evaluate the accuracy of the convex IVACOPF with shunt modeling, the absolute linearization error of active power balance (APB) constraint is shown in FIG. 8 for the last iteration (i.e., iteration 2) by subtracting right sides (RSs) of (9) and (15) for each node and phase of the test system. Similarly, the absolute linearization error of reactive power balance (RPB) constraint is calculated at the last iteration by subtracting RSs of (10) and (16) for each node and phase of the utility network, and is shown in FIG. 9.

It can be seen in FIGS. 8 and 9 that the linearization errors of APB and RPB constraints are significantly small. Note that larger node numbers represent nodes further away from the substation. Also, the absolute linearization error of voltage magnitude (VM) constraint is given in FIG. 10 for each node and phase of the test system by subtracting RSs of (12) and (17) at the last iteration. According to FIGS. 8-10, it can be observed that the convex IVACOPF with shunt modeling approximates the APB, RPB, and VM constraints very accurately.

B. Different Loading Scenarios

In this section, the convex IVACOPF model is further evaluated using different extreme loading scenarios of the electric utility feeder in Arizona. In this regard, four loading scenarios are considered as follows:

S1: 50% load increase

S2: 100% load increase

S3: 50% load decrease

S4: 100% load decrease

In each scenario, different load percentage changes are applied to each load of the network. It should be noted that IVACOPF is tested on an actual distribution feeder of a utility in Arizona with many practical details. IVACOPF models all practical details of actual unbalanced distribution systems such as no-load loss of distribution transformers, line losses, and shunt elements of distribution lines. Therefore, even in the scenario S4 with no load in the feeder (100% decrease), the distribution network operation and power flow solution are affected by the no-load loss of distribution transformers, line losses, shunt elements of distribution lines, and PV units output with unity power factor. To evaluate the accuracy of IVACOPF, each of the loading scenarios is also modeled in OpenDSS. The results of the convex IVACOPF model and OpenDSS for the 2100-bus system are compared using Root Mean Square Error (RMSE) of the voltage magnitude and the voltage angle for all loading scenarios. Table 6 illustrates the RMSE values for the base case scenario and each of the loading scenarios.

TABLE 6

RMSE of voltage magnitude and voltage angle
for different loading scenarios

| Scenario | RMSE Magnitude (pu) | RMSE Angle (radian) |
|---|---|---|
| Base case | 2.58E–05 | 6.68E–06 |
| S1 | 2.65E–05 | 9.88E–06 |
| S2 | 7.96E–05 | 2.66E–05 |
| S3 | 2.87E–05 | 6.93E–06 |
| S4 | 3.25E–05 | 1.11E–05 |

In Table 6, base case scenario refers to the original loading scenario of the test system (i.e., IVACOPF with shunt in Table 4). It can be seen in Table 6 that the RMSE values are very small for all loading scenarios.

TABLE 7

Error in Active and Reactive Power of substation
bus for phase A of each scenario

| Scenario | Active Error (%) | Reactive Error (%) |
|---|---|---|
| Base case | 0.061 | –0.009 |
| S1 | 0.055 | 0.026 |
| S2 | 0.046 | 0.012 |
| S3 | 0.182 | 0.012 |
| S4 | –0.280 | –0.006 |

Also, the errors in active and reactive power of the substation bus obtained by the convex IVACOPF model with respect to those of OpenDSS are shown in Table 7 for phase a. It should be noted that more details of the substation active and reactive power errors for the base case scenario are shown in Table 4. It can be observed in Table 5 that the active and reactive power errors at phase a of the substation bus are very small for all loading scenarios. Results of Tables 6 and 7 illustrate that the convex IVACOPF model is remarkably accurate under different system conditions of an actual unbalanced distribution network. Therefore, IVA-COPF can be utilized by electric utilities to optimize their operation and make informed decisions in a wide range of real-world situations.

C. DERs Scheduling Using Convex IVACOPF

Figure 11:
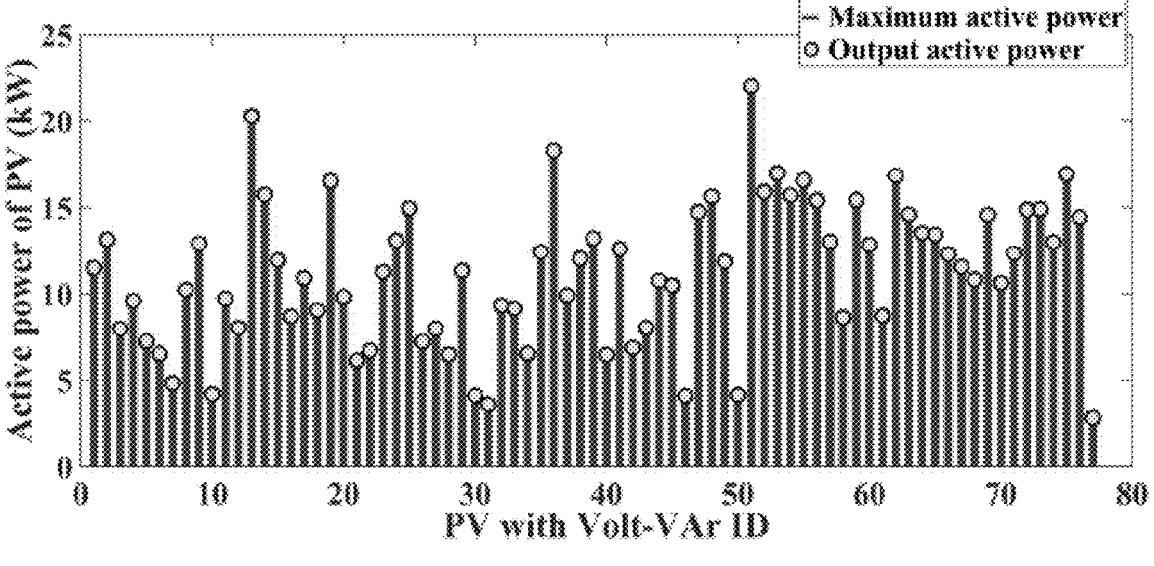
FIG. 11 is a graphical representation showing maximum active power and output active power of PV units with Volt-Var controllers.
Figure 12:
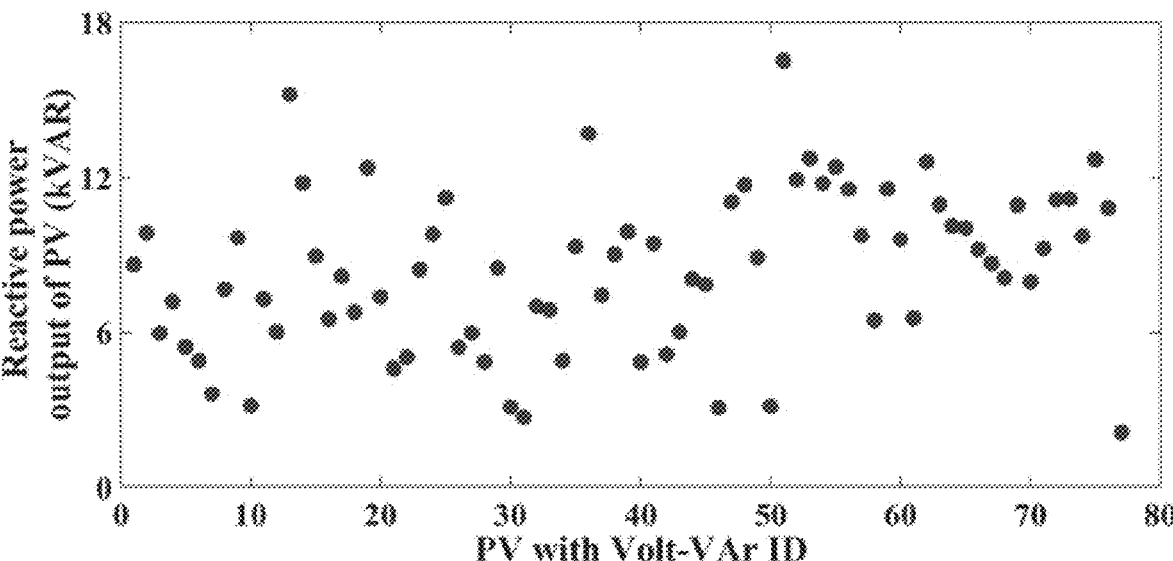
FIG. 12 is a graphical representation showing reactive power output of PV units with Volt-Var controllers.

The performance of the iterative convex IVACOPF model for solving DERs scheduling problem in an unbalanced distribution network (i.e., the model presented in (24) in Section III.A) is shown in this section using the described utility feeder data. In this regard, Volt-VAr controller characteristics of smart inverters as outlined in IEEE standard 1547-2018 is modeled within the IVACOPF model. In particular, 77 out of 250 PV units in the electric utility feeder in Arizona are considered to be equipped with smart inverters (e.g., Volt-VAr controllers). These units can provide both active and reactive power support while the rest of PV units are operating in unity power factor. As shown in (24), the objective function of the DERs scheduling problem is minimizing system operation cost and PV curtailment. The PV generation price is considered 27.81 $/MWh according to the net surplus compensation rates of Pacific Gas and Electric (PG&E) on Jul. 15, 2019. The wholesale electricity price at substation is considered 101.84 $/MWh using the locational marginal price (LMP) of PG&E area in the California Independent System Operator (CAISO) map on Jul. 15, 2019. FIG. 11 illustrates the active power of PV units with smart inverters. As can be seen in FIG. 11, the active power output of all PV units with smart inverters is equal to the maximum available PV generation at 5 μm on Jul. 15, 2019. Note that the system load is higher than total available PV generation of 1.903 MW at this snapshot, and there is no voltage violation in this case. The reactive power output of PV smart inverters with Volt-VAr controller is shown in FIG. 12.

D. Convex IVACOPF State Estimation

In this section, the results of QP-based state estimation and LP-based state estimation are presented. Input measurement data of the distribution state estimation for the utility feeder include smart meters data, PV meters data, pseudo micro-PMU data, and substation SCADA measurements. Gaussian distribution with error of 10%, 10%, and 1% is considered for modeling measurement noise of smart meters, PV meters, and SCADA measurements, respectively. Gaussian distribution subject to Total Vector Error ≤0.05% is considered for micro-PMU data noise modelling.

1) QP-Based State Estimation

TABLE 8

Distribution state estimation results for cases 1-5 based on QP model.

| | Model | | | | |
|---|---|---|---|---|---|
| | QP | QP | QP Case | QP | QP |
| | 1 | 2 | 3 | 4 | 5 |
| Number of micro-PMU | 31 | 2 | 1 | 2 | 1 |
| PMU measurement noise | No | Yes | Yes | Yes | Yes |
| Weighted objective function | No | No | No | Yes | Yes |
| RMSE magnitude (pu) | 0.00025 | 0.00039 | 0.00072 | 0.00034 | 0.00049 |
| MAE magnitude (pu) | 0.00010 | 0.00030 | 0.00051 | 0.00022 | 0.00039 |
| RMSE angle (radian) | 0.00024 | 0.00038 | 0.00099 | 0.00026 | 0.00039 |
| MAE angle (radian) | 0.00011 | 0.00027 | 0.00088 | 0.00018 | 0.00029 |

Figure 13:
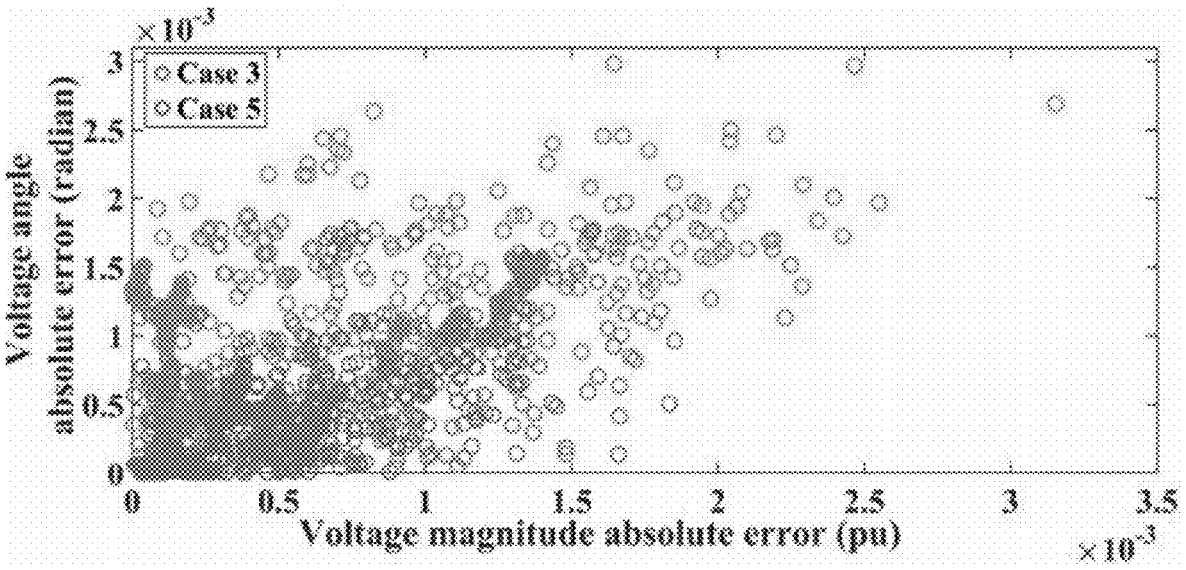
FIG. 13 is a graphical representation showing comparison of state estimation results of cases 3 and 5 for all nodes.
Figure 14:
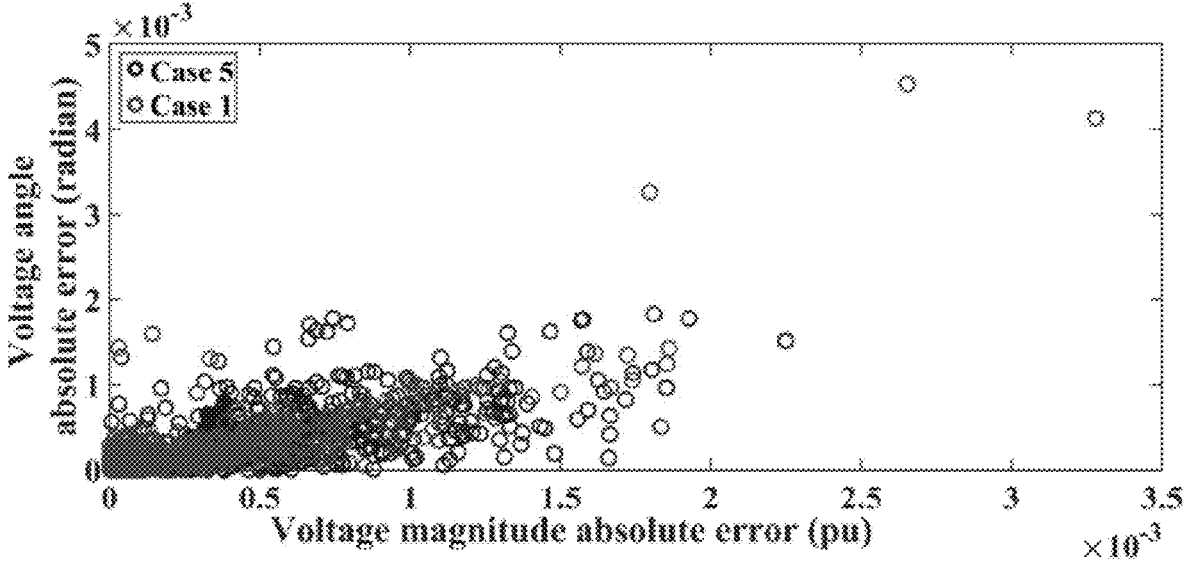
FIG. 14 is a graphical representation showing comparison of state estimation results of cases 1 and 5 for all nodes.

In order to evaluate sensitivity of the QP-based state estimation model based on convex IVACOPF to sensors availability, different micro-PMU numbers are located in local utility distribution feeder. The studied cases with different micro-PMU numbers are summarized in Table 8. In case 1, 30 micro-PMUs are placed in the local utility feeder in addition to one micro-PMU at substation without considering micro-PMUs measurement noise. In cases 2 and 4, two micro-PMUs are considered in the utility distribution feeder (one in substation and another in the feeder). In cases 3 and 5, only one micro-PMU is considered, which is modeled at the substation. In cases 2 and 3, micro-PMUs measurement noise is considered while the weighted state estimation model is not considered. Both micro-PMUs measurement noise and weighted objective function with respect to measurements noise of all sensors are modeled in cases 4 and 5. It should be mentioned that measurement noise of the other sensors (i.e., smart meters data, PV output meter data, and substation SCADA measurements) are considered in cases 1-5. To appraise the results of the distribution state estimation, Root Mean Square Error (RMSE) and Mean Absolute Error (MAE) indices are utilized. Table 8 shows the results of distribution state estimation for cases 1-5 and all nodes of the utility feeder using RMSE and MAE indices. It can be observed in Table 8 that when measurements noise is considered (i.e., cases 2-5), the state estimation model based on the weighted objective function has less voltage magnitude and voltage angle errors in cases 4 and 5 compared to cases 2 and 3. FIGS. 13 and 14 are presented to demonstrate a more detailed representation of the voltage magnitude and voltage angle errors for each node and phase of the test system. Each circle in FIGS. 13 and 14 shows the voltage magnitude and voltage angle absolute errors for each phase and bus of the 2100-bus test system.

FIG. 13 compares the absolute value of voltage magnitude and voltage angle errors for all 2100 buses of the utility feeder for Case 3 and Case 5. It can be seen in FIG. 13 that the voltage magnitude error and voltage angle error of most of buses in Case 5 are below 0.001 pu and 0.001 radian respectively. However, in Case 3 without considering weighted objective function, significant number of buses have higher voltage magnitude and voltage angle errors compared to Case 5. The absolute errors of voltage magnitude and voltage angle of 2100 buses of cases 1 and 5 are compared in FIG. 14. Based on results of Table 8 and FIG. 14, it can be observed that the results of the state estimation with 31 micro-PMUs and without considering measurements noise of micro-PMUs are comparable with the one with 1 micro-PMU and considering measurements noise.

Figure 15:
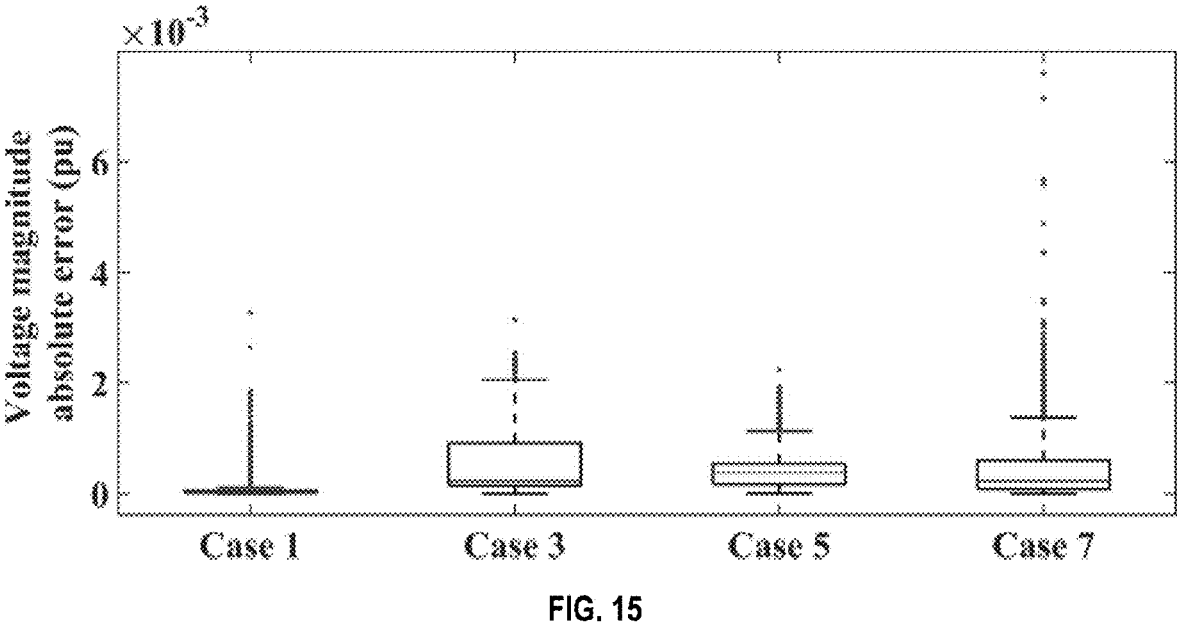
FIG. 15 is a graphical representation showing distribution of voltage magnitude absolute error for different cases.
Figure 16:
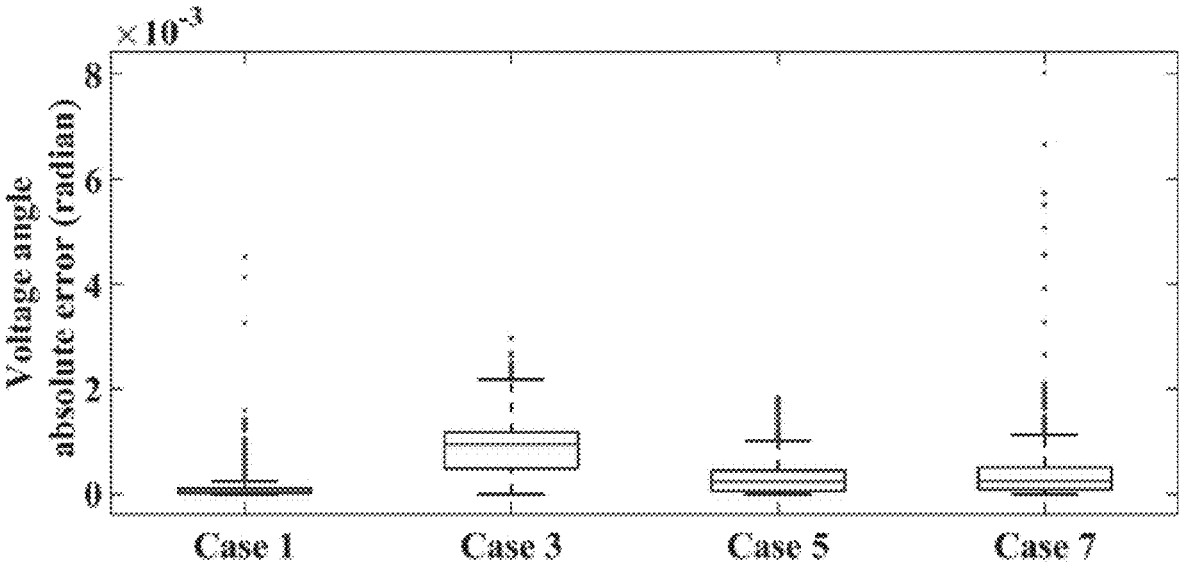
FIG. 16 is a graphical representation showing distribution of voltage angle absolute error for different cases.

In order to further analyze the accuracy of different cases discussed in FIGS. 13 and 14, the distributions of voltage magnitude and voltage angle absolute errors for each case are shown in FIGS. 15 and 16, respectively. The comparison analyses presented in FIGS. 13-16 and Table 8 illustrate that the QP-based state estimation approach with the modeling measurement noise and the weighted objective function is accurate and suitable for distribution systems with limited measurements data (i.e., Case 5 with only one micro-PMU). In this regard, the electric utility of the test system only needs to install one micro-PMU at substation in order to perform the state estimation task with high accuracy.

The results show that the state estimation model can be implemented without the need for installation of a large number of new sensors. In the next section, analysis of choice of objective function is presented by comparing Case 5 with Cases 6 and 7.

2) LP-Based State Estimation

TABLE 9

State estimation error evaluation based on LP model.

| | Case | |
|---|---|---|
| | 6 | 7 |
| Number of micro-PMU | 2 | 1 |
| micro-PMU measurement noise | Yes | Yes |
| Weighted objective function | Yes | Yes |
| RMSE magnitude (pu) | 0.00060 | 0.00073 |
| MAE magnitude (pu) | 0.00034 | 0.00044 |
| RMSE angle (radian) | 0.00051 | 0.00056 |
| MAE angle (radian) | 0.00032 | 0.00035 |

Figure 17:
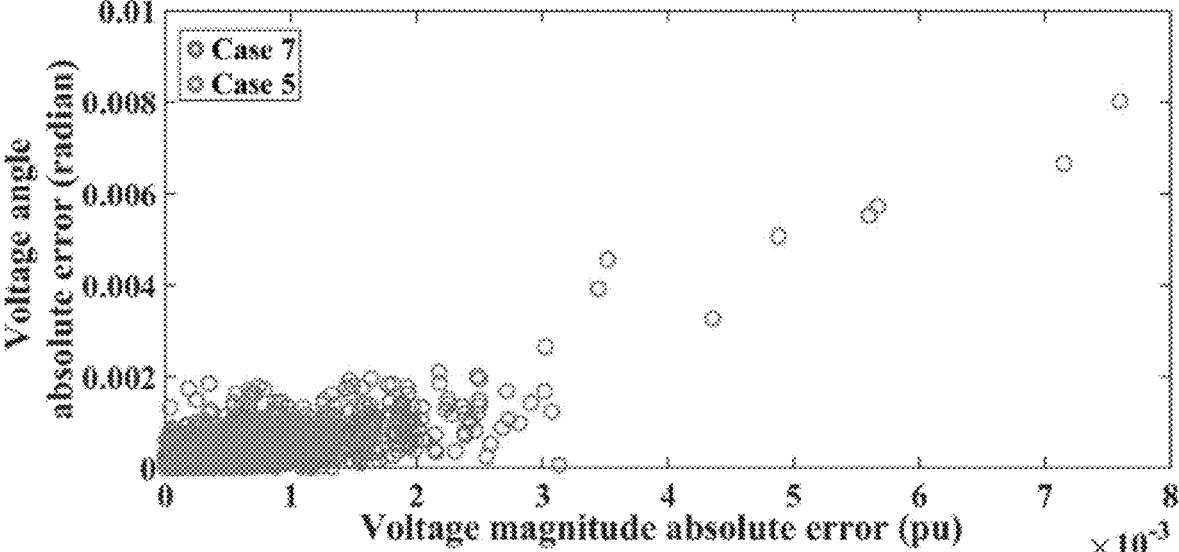
FIG. 17 is a graphical representation showing comparison of state estimation results of cases 5 and 7 for all nodes.

In order to compare the performance of the QP model with the LP model considering linearized absolute objective function, two cases are studied in which measurement noise of all sensors and weighted objective function are considered. The state estimation results of the two cases including voltage magnitude and voltage angle errors of all nodes are presented in Table 9. By comparing Table 8 and Table 9, it can be seen that RMSE and MAE indices for both voltage magnitude and voltage angle are smaller in cases 4 and 5 based on QP model compared to cases 6 and 7 based on LP model. The distributions of the voltage magnitude and voltage angle absolute errors for Cases 5 and 7 are compared in FIGS. 15 and 16, respectively. Also, the absolute value of voltage magnitude and voltage angle error for each of 2100 buses are presented in FIG. 17 for cases 5 and 7. According to FIGS. 15-17, the QP-based state estimation model estimates system states more accurately compared to the LP-based model Therefore, it can be concluded that the QP-based state estimation model with weighted objective function is the most accurate model for estimating system states in the unbalanced distribution network.

V. Conclusion

In this disclosure, novel nonlinear and convex IVACOPF models are presented for an unbalanced distribution system. The nonlinear and convex IVACOPF models are tested using data of a distribution feeder of an electric utility company in Arizona. The comparison of the nonlinear and convex IVACOPF models with OpenDSS and LinDistFlow method illustrates that the IVACOPF methods accurately estimate the system active and reactive power losses, voltage magnitudes, and voltage angles. This accuracy is achieved by precisely modeling all components of an unbalanced distribution system such as details of untransposed distribution lines and distribution transformers. While both IVACOPF models are accurate and fast enough, the convex IVACOPF with shunt modeling is recommended since it is faster and will always converge. Moreover, it is shown that the LinDistFlow model has large active power, reactive power, and voltage magnitude estimation errors due to strong assumptions of ignoring line losses, considering nearly balance bus voltages, ignoring voltage angle modeling, and inability to model shunt elements of distribution lines. The application of the convex IVACOPF method for DERs scheduling and state estimation is discussed in this disclosure. The results confirm the effectiveness of IVACOPF for DER scheduling. Different models are proposed to solve the state estimation in an unbalanced primary distribution system using the QP model and LP model with a linearized absolute objective function. New measurement technologies in the modern distribution networks including micro-PMUs and smart meters are considered. The performances of the proposed QP and LP-based state estimation models are compared. The results show that the proposed QP model can estimate system state with higher accuracy compared to the LP model. Also, the results show that the accuracy of the proposed QP-based state estimation model for unbalanced distribution system is high even with only few micro-PMUs and consideration of measurement noises.

The IVACOPF model can be incorporated as a component of larger systems that manage unbalanced distribution systems. For example, the IVACOPF model can be jointly applied for estimating states, determining topology errors, and detecting outages of an unbalanced distribution system. The IVACOPF model can also be applied for planning and/or optimization of a topology and/or a resource mix of an unbalanced distribution system.

The present novel concept of the subject disclosure (IVACOPF) can be used as part of a system for optimal scheduling of distributed energy resources considering Volt-VAr controllers of PV smart inverters as described in Soltani et al. (Z. Soltani, S. Ma, M. Ghaljehei, and M. Khorsand, "Optimal scheduling of distributed energy resources considering Volt-VAR controller of PV smart inverters," *arXiv* (*Cornell University*), March 2022, doi: 10.48550/ arxiv.2203.11448), herein incorporated by reference in its entirety.

The present novel concept of the subject disclosure (IVACOPF) can be used as part of a system for optimal placement of PV smart inverters with Volt-VAr control in electric distribution systems as described in Chen et al. (M. Chen, S. Ma, Z. Soltani, R. Ayyanar, V. Vittal, and M. Khorsand, "Optimal placement of PV smart inverters with Volt-VAR control in electric distribution systems," *IEEE Systems Journal*, vol. 17, no. 3, pp. 3436-3446, September 2023, doi: 10.1109/jsyst.2023.3256121), herein incorporated by reference in its entirety.

The present novel concept of the subject disclosure (IVACOPF) can be used as part of a system for Simultaneous Robust State Estimation, Topology Error Processing, and Outage Detection for Unbalanced Distribution Systems as described in Soltani et al. (Z. Soltani, S. Ma, M. Khorsand and V. Vittal, "Simultaneous Robust State Estimation, Topology Error Processing, and Outage Detection for Unbalanced Distribution Systems," IEEE Trans. Power Syst., vol. 38, no. 3, May 2023), herein incorporated by reference in its entirety.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
a processor in communication with a memory, the memory including instructions executable by the processor to:
access state data descriptive of a state of an unbalanced distribution network;
identify one or more unknown parameters of a plurality of parameters of the unbalanced distribution network based on the state data; and
evaluate, based on the state data, a value of the one or more unknown parameters of the unbalanced distribution network using an objective function constrained by a set of unbalanced distribution network constraints that collectively model operation of the unbalanced distribution network, the set of unbalanced distribution network constraints incorporating, for a three-phase distribution line of the unbalanced distribution network that is connected to a first bus of a plurality of buses of the unbalanced distribution network:
a mutual current coupling, a mutual voltage coupling, and resultant line power losses within each phase and between each respective phase of the three-phase distribution line; and
a shunt admittance impact within each phase and between each respective phase of the three-phase distribution line.

2. The system of claim 1, the set of unbalanced distribution network constraints further incorporating, for the first bus connected to the three-phase distribution line of the unbalanced distribution network, one or more of: an injected active power and an injected reactive power associated with one or more of: a distributed energy resource, a customer load, a distribution transformer, and a capacitor bank of the unbalanced distribution network.

3. The system of claim 2, the injected active power incorporating a no-load power loss associated with the distribution transformer.

4. The system of claim 2, wherein the distributed energy resource includes a renewable energy resource that injects power into the unbalanced distribution network.

5. The system of claim 2, the memory further including instructions executable by the processor to:
iteratively determine the injected active power associated with the bus and the phase, the injected active power being expressed as a convexified linear approximation of injected active power.

6. The system of claim 2, the memory further including instructions executable by the processor to:
iteratively determine the injected reactive power associated with the bus and the phase, the injected reactive power being expressed as a convexified linear approximation of injected reactive power.

7. The system of claim 1, the memory further including instructions executable by the processor to:
generate, based on the state data and based on the values of the one or more unknown parameters of the unbalanced distribution network, a graphical representation for display at a display device.

8. The system of claim 7, the graphical representation showing a system topology of the unbalanced distribution network that includes values of the one or more unknown parameters of the unbalanced distribution network.

9. The system of claim 1, the memory further including instructions executable by the processor to:

access optimization data indicative of an optimization goal for optimization of the unbalanced distribution network, the optimization data specifying the one or more unknown parameters of the unbalanced distribution network to be optimized according to one or more optimization rules.

10. The system of claim 9, the memory further including instructions executable by the processor to:

apply a control input to one or more components of the unbalanced distribution network based on the values of the one or more unknown parameters of the unbalanced distribution network.

11. The system of claim 1, the objective function including a convex quadratically constrained quadratic programming formulation that jointly determines an operation cost and distributed energy resource curtailment for optimal scheduling of distributed energy resources of the unbalanced distribution network.

12. The system of claim 1, the objective function including a quadratic programming formulation that minimizes a difference between modeled values and measured values for estimating a state of one or more components of the unbalanced distribution network.

13. The system of claim 12, the objective function being subject to a constraint that incorporates reactive power consumption of one or more components of the unbalanced distribution network.

14. The system of claim 12, the objective function modeling a potential outage associated with a portion of the unbalanced distribution network as a state of a switch associated with the portion of the unbalanced distribution network, and wherein evaluating the objective function enables estimation of the state of the switch based on the estimated state of one or more components of the unbalanced distribution network with respect to the set of unbalanced distribution network constraints.

15. The system of claim 1, the memory further including instructions executable by the processor to:

iteratively simulate operation of the unbalanced distribution network based on the objective function and the set of unbalanced distribution network constraints resulting in simulation data indicative of a simulated state of the unbalanced distribution network;

measure a state of one or more components of the unbalanced distribution network based on measurements accessed by the processor from one or more components of the unbalanced distribution network; and adjust one or more parameters of the unbalanced distribution network, the objective function and/or the set of unbalanced distribution network constraints based on a difference between the simulated state of the unbalanced distribution network and the state of the unbalanced distribution network as measured.

16. The system of claim 1, the objective function including a formulation that determines an error of the unbalanced distribution network based on an estimated state of one or more components of the unbalanced distribution network with respect to the set of unbalanced distribution network constraints.

17. The system of claim 1, the objective function including a formulation that optimizes a resource mix of the unbalanced distribution network with respect to one or more resource limitations based on an estimated state of one or more components of the unbalanced distribution network with respect to the set of unbalanced distribution network constraints.

18. The system of claim 1, the set of unbalanced distribution network constraints incorporating:

a droop control constraint for a photovoltaic inverter of the unbalanced distribution network that adaptively adjusts generation or absorption of reactive power by the photovoltaic inverter based on a value of a local voltage with respect to one or more local voltage operating zones, the one or more local voltage operating zones being adaptively adjusted based on the state data of the unbalanced distribution network.

19. A method, comprising:

accessing state data descriptive of a state of an unbalanced distribution network;

identifying one or more unknown parameters of a plurality of parameters of the unbalanced distribution network based on the state data; and evaluating, based on the state data, a value of the one or more unknown parameters of the unbalanced distribution network using an objective function constrained by a set of unbalanced distribution network constraints that collectively model operation of the unbalanced distribution network, the set of unbalanced distribution network constraints incorporating, for a three-phase distribution line of the unbalanced distribution network that is connected to a first bus of a plurality of buses of the unbalanced distribution network:

a mutual current coupling, a mutual voltage coupling, and resultant line power losses within each phase and between each respective phase of the three-phase distribution line; and a shunt admittance impact within each phase and between each respective phase of the three-phase distribution line.

20. The method of claim 19, the set of unbalanced distribution network constraints further incorporating, for the first bus connected to the three-phase distribution line of the unbalanced distribution network, one or more of: an injected active power and an injected reactive power associated with one or more of: a distributed energy resource, a customer load, a distribution transformer, and a capacitor bank of the unbalanced distribution network, the injected active power incorporating a no-load power loss associated with the distribution transformer.

* * * * *